(12) United States Patent
Adams

(10) Patent No.: US 9,684,838 B2
(45) Date of Patent: Jun. 20, 2017

(54) EMPIRICAL DATA MODELING

(75) Inventor: Jeffrey Brian Adams, Belmont, CA (US)

(73) Assignee: Rokio, Inc., Pleasanton, CA (US)

( * ) Notice: Subject to any disclaimer, the term of this patent is extended or adjusted under 35 U.S.C. 154(b) by 1289 days.

(21) Appl. No.: 13/474,580

(22) Filed: May 17, 2012

(65) Prior Publication Data

US 2012/0226643 A1  Sep. 6, 2012

Related U.S. Application Data

(63) Continuation of application No. 13/164,032, filed on Jun. 20, 2011, now Pat. No. 8,214,311, which is a continuation of application No. 11/838,832, filed on Aug. 14, 2007, now Pat. No. 7,966,274.

(60) Provisional application No. 60/837,824, filed on Aug. 14, 2006, provisional application No. 60/837,825, filed on Aug. 14, 2006.

(51) Int. Cl.
  *G06K 9/00* (2006.01)
  *G06K 9/62* (2006.01)

(52) U.S. Cl.
  CPC ....... *G06K 9/00986* (2013.01); *G06K 9/6253* (2013.01)

(58) Field of Classification Search
  CPC combination set(s) only.
  See application file for complete search history.

(56) References Cited

U.S. PATENT DOCUMENTS

| | | | |
|---|---|---|---|
| 5,293,457 A | 3/1994 | Arima et al. | |
| 5,621,863 A | 4/1997 | Boulet et al. | |
| 5,701,397 A | 12/1997 | Steimle et al. | |
| 5,710,869 A | 1/1998 | Godefroy et al. | |
| 5,717,832 A | 2/1998 | Steimle et al. | |
| 5,740,326 A | 4/1998 | Boulet et al. | |
| 6,778,704 B1 | 8/2004 | Kawatani | |
| 6,892,193 B2 | 5/2005 | Bolle et al. | |

(Continued)

FOREIGN PATENT DOCUMENTS

WO  WO 2008/022156  2/2008
WO  WO 2015/034759  3/2015

OTHER PUBLICATIONS

Guillaume, Designing Fuzzy Inference Systems from Data: An Interpretability-Oriented Review [online], 2001 [retrieved on Jun. 8, 2015]. Retrieved from the Internet:<URL:http://www.google.com/url?sa=t&rct=j&q=&esrc=s&source=web&cd=10&cad=rja&uact=8&ved=0CFUQFjAJahUKEwiy_8axpJjHAhVIzYAKHRovBhA&url=http%3A%2F%2Fsci2s.ugr.es%2Fkeel%2Fpdf>.*

(Continued)

*Primary Examiner* — Michael B Holmes
(74) *Attorney, Agent, or Firm* — Weaver Austin Villeneuve & Sampson LLP

(57) ABSTRACT

Methods, apparatuses and systems directed to pattern identification and pattern recognition. In some particular implementations, the invention provides a flexible pattern recognition platform including pattern recognition engines that can be dynamically adjusted to implement specific pattern recognition configurations for individual pattern recognition applications. In some implementations, the present invention also provides for a partition configuration where knowledge elements can be grouped and pattern recognition operations can be individually configured and arranged to allow for multi-level pattern recognition schemes.

23 Claims, 26 Drawing Sheets

Fig. 1

(56) References Cited

U.S. PATENT DOCUMENTS

| | | | | |
|---|---|---|---|---|
| 7,966,274 B2* | 6/2011 | Adams | ............... | G06K 9/00986 382/159 |
| 7,966,277 B2* | 6/2011 | Adams | ............... | G06K 9/00986 706/20 |
| 8,214,311 B2* | 7/2012 | Adams | ............... | G06K 9/00986 382/159 |
| 2002/0152069 A1 | 10/2002 | Gao et al. | | |
| 2008/0120108 A1 | 5/2008 | Soong et al. | | |
| 2008/0270338 A1* | 10/2008 | Adams | ............... | G06K 9/00986 706/48 |
| 2009/0144212 A1* | 6/2009 | Adams | ................ | G06K 9/6253 706/20 |
| 2011/0251981 A1* | 10/2011 | Adams | ............... | G06K 9/00986 706/12 |
| 2012/0226643 A1* | 9/2012 | Adams | ................ | G06K 9/6253 706/12 |
| 2015/0178631 A1* | 6/2015 | Thomas | ............... | G06K 9/0053 706/12 |

OTHER PUBLICATIONS

Goh04, A Novel Feature Selection Method to Improve Classification of Gene Expression Data [online], 2004 [retrieved on Jun. 14, 2016]. Retrieved from the Internet:<URL:http://dl.acm.org/ft_gateway.cfm?id=976542&ftid=257005&dwn=1&CFID=785182646&CFTOKEN=70022701>.*

Unsupervised Word Segmentation and Lexicon Discovery Using Acoustic Word Embeddings Herman Kamper; Aren Jansen; Sharon Goldwater IEEE/ACM Transactions on Audio, Speech, and Language Processing Year: 2016, vol. 24, Issue: 4 pp. 669-679, DOI: 10.1109/TASLP.2016.2517567 IEEE Journals & Magazines.*

Unsupervised induction and filling of semantic slots for spoken dialogue systems using frame-semantic parsing Yun-Nung Chen; William Yang Wang; Alexander I. Rudnicky 2013 IEEE Workshop on Automatic Speech Recognition and Understanding Year: 2013 pp. 120-125, DOI: 10.1109/ASRU.2013.6707716 IEEE Conference Publications.*

Diagnosing a priori unknown faultsby modified supervised-unsupervised learning algorithm Gábor Terstyánszky; LászlóKovács 2001 European Control Conference (ECC) Year: 2001 pp. 1637-1641 IEEE Conference Publications.*

Bio-inspired deep learning model for object recognition Konstantinos Charalampous; Antonios Gasteratos 2013 IEEE International Conference on Imaging Systems and Techniques (IST) Year: 2013 pp. 51-55, DOI: 10.1109/IST.2013.6729661 IEEE Conference Publications.*

Notice of Allowance dated Feb. 16, 2011, U.S. Appl. No. 11/838,832.

Office Action dated Jul. 27, 2010, U.S. Appl. No. 11/838,832.

Notice of Allowance dated Mar. 8, 2012, U.S. Appl. No. 13/164,032.

Office Action dated Aug. 18, 2011, U.S. Appl. No. 13/164,032.

Notice of Allowance dated Feb. 14, 2011, U.S. Appl. No. 11/838,839.

Office Action dated Jul. 23, 2010, U.S. Appl. No. 11/838,839.

Zemouri et al., Recurrent radial basis function network for time-serios prediction, Engineering Applications of Artificial Intelligence 16, pp. 453-463, 2003.

Tarassenko et al., New Method of automated sleep quantification, Med. & Biol. Eng. & Comput., 1992, 30, 509-517.

Zboril, Sparse Distributed Memory and Restricted Coulomb Energy Classifier, Proceedings of the MOSIS'98, MARQ, Ostrava, Sv. Hostyn-Bystrice pod Hostynem, 1998, p. 171-176.

PCT International Search Report, PCT U.S. Appl. No. PCTUS07/75938 dated Nov. 3, 2008.

Abdi, Herve, "A Neural Network Prime", Journal of Biological Systems, vol. 2(3), pp. 247-283 (1994).

PCT International Preliminary Report on Patentability dated Feb. 17, 2009 issued in PCT/US2007/075938.

PCT International Search Report and Written Opinion dated Jan. 29, 2015 issued in PCT/US2014/053292.

* cited by examiner

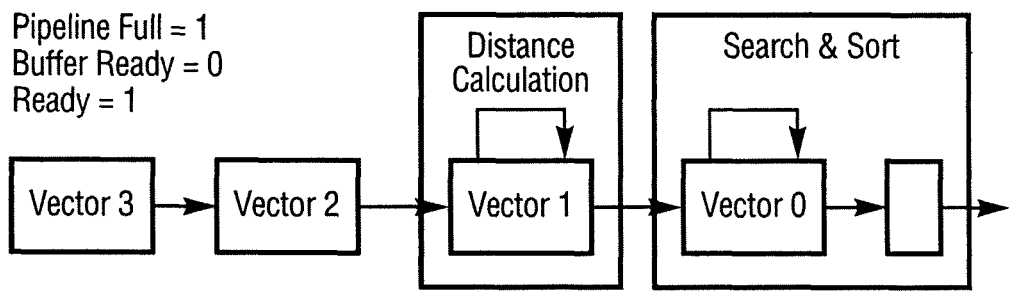
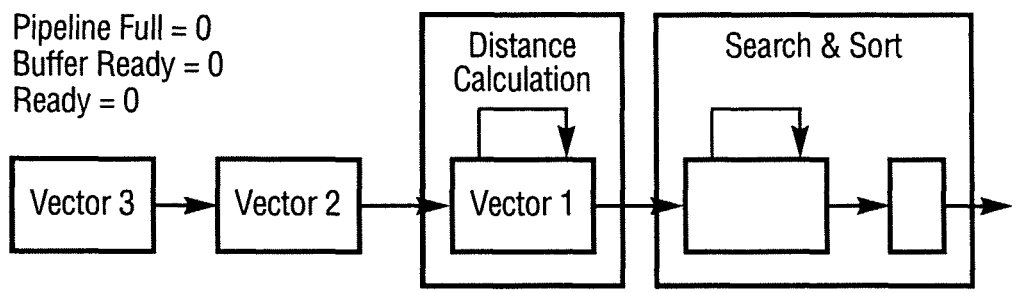
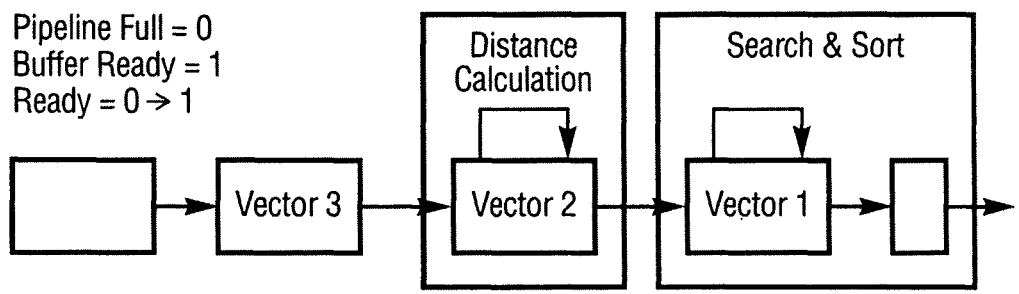
Fig. 26

EMPIRICAL DATA MODELING

RELATED APPLICATION DATA

The present application is a continuation of and claims priority under 35 U.S.C. 120 to U.S. patent application Ser. No. 13/164,032 for Enhanced Learning and Recognition Operations for Radial Basis Functions filed on Jun. 20, 2011, which is a continuation of U.S. patent application Ser. No. 11/838,832 (now U.S. Pat. No. 7,966,274) for Enhanced Learning and Recognition Operations for Radial Basis Functions filed on Aug. 14, 2007, which claims priority under 35 U.S.C. 119(e) to U.S. Provisional Application Nos. 60/837,824 and 60/837,825, both filed on Aug. 14, 2006, the entire disclosure of each of which is incorporated herein by reference for all purposes.

FIELD OF THE INVENTION

The present disclosure relates to pattern identification and pattern recognition, including, for example, machine vision and surveillance using computer vision.

BACKGROUND

Pattern recognition involves classification of data (patterns) based on either a priori knowledge or on statistical information extracted from the patterns. The patterns to be classified are usually groups of measurements or observations (vectors), defining points in a multidimensional space. A pattern recognition system may include a sensor that gathers the observations to be classified or described; a feature extraction mechanism that computes numeric or symbolic information from the observations; and a classification or description scheme that performs the actual function of classifying or describing observations, relying on the extracted features.

The classification or description scheme is usually based on the availability of a set of patterns that have already been classified or described. This set of patterns is termed the training set and the resulting learning strategy is characterized as supervised learning. Learning can also be unsupervised, in the sense that the system is not given an a priori labeling of patterns, instead it establishes the classes itself based on the statistical regularities of the patterns.

A wide range of algorithms can be applied for pattern recognition, from very simple Bayesian classifiers to neural networks. An artificial neural network (ANN), often just called a "neural network" (NN), is an interconnected group of artificial neurons that uses a mathematical model or computational model for information processing based on a connectionist approach to computation. An ANN can be an adaptive system that changes its structure based on external or internal information that flows through the network. Artificial neural networks can be used to model complex relationships between inputs and outputs or to find patterns in data. For many years, academia and industry have been researching pattern recognition based on artificial neural networks. However, this research has yielded very few practical real-world applications.

Typical applications for pattern recognition are automatic speech recognition, classification of text into several categories (e.g. spam/non-spam email messages), the automatic recognition of handwritten postal codes on postal envelopes, or the automatic recognition of images of human faces. The last two examples form the subtopic image analysis of pattern recognition that deals with digital images as input to pattern recognition systems.

Programmable logic devices (PLDs) are a type of digital integrated circuit that can be programmed to perform specified logic functions. One type of PLD, the field programmable gate array (FPGA), typically includes an array of configurable logic blocks (CLBS) surrounded by a ring of programmable input/output blocks (IOBs). Some FPGAs also include additional logic blocks with special purposes (Digital Signal Processing (DSP) blocks, Random Access Memory (RAM) blocks, Phase Lock Loops (PLL), and so forth). FPGA logic blocks typically include programmable logic elements such as lookup tables (LUTs), flip flops, memory elements, multiplexers, and so forth. The LUTs are typically implemented as RAM arrays in which values are stored during configuration (i.e., programming) of the FPGA. The flip-flops, multiplexers, and other components may also be programmed by writing configuration data to configuration memory cells included in the logic block. For example, the configuration data bits can enable or disable elements, alter the aspect ratios of memory arrays, select latch or flip-flop functionality for a memory element, and so forth. The configuration data bits can also select interconnection between the logic elements in various ways within a logic block by programmably selecting multiplexers inserted in the interconnect paths within CLB and between CLBs and IOBs.

SUMMARY

The present invention provides methods, apparatuses and systems directed to pattern identification and pattern recognition. In some particular implementations, the invention provides a flexible pattern recognition platform including pattern recognition engines that can be dynamically adjusted to implement specific pattern recognition configurations for individual pattern recognition applications. In some implementations, the present invention also provides for a partition configuration where knowledge elements can be grouped and pattern recognition operations can be individually configured and arranged to allow for multi-level pattern recognition schemes. In some implementations, the present invention provides a concurrent or near concurrent matching system, providing real-time pattern identification and recognition via a parallel or nearly parallel architecture. In one implementation, the present invention provides a virtual pattern recognition system, where virtual decision elements map to a smaller number of physical implementers or physical decision elements that operate in parallel. In some implementations, the system is also data-agnostic and can handle any type of data (image, video, audio, chemical, text, binary, etc.). Still further, some implementations provide systems capable of providing proximity (fuzzy) recognition or exact matching, via a recognition engine which is autonomous once it has been taught.

DESCRIPTION OF THE DRAWINGS

FIGS. 23 to 26 illustrate how an example implementation may process input vectors in a pipelining mechanism.

Figure 1:
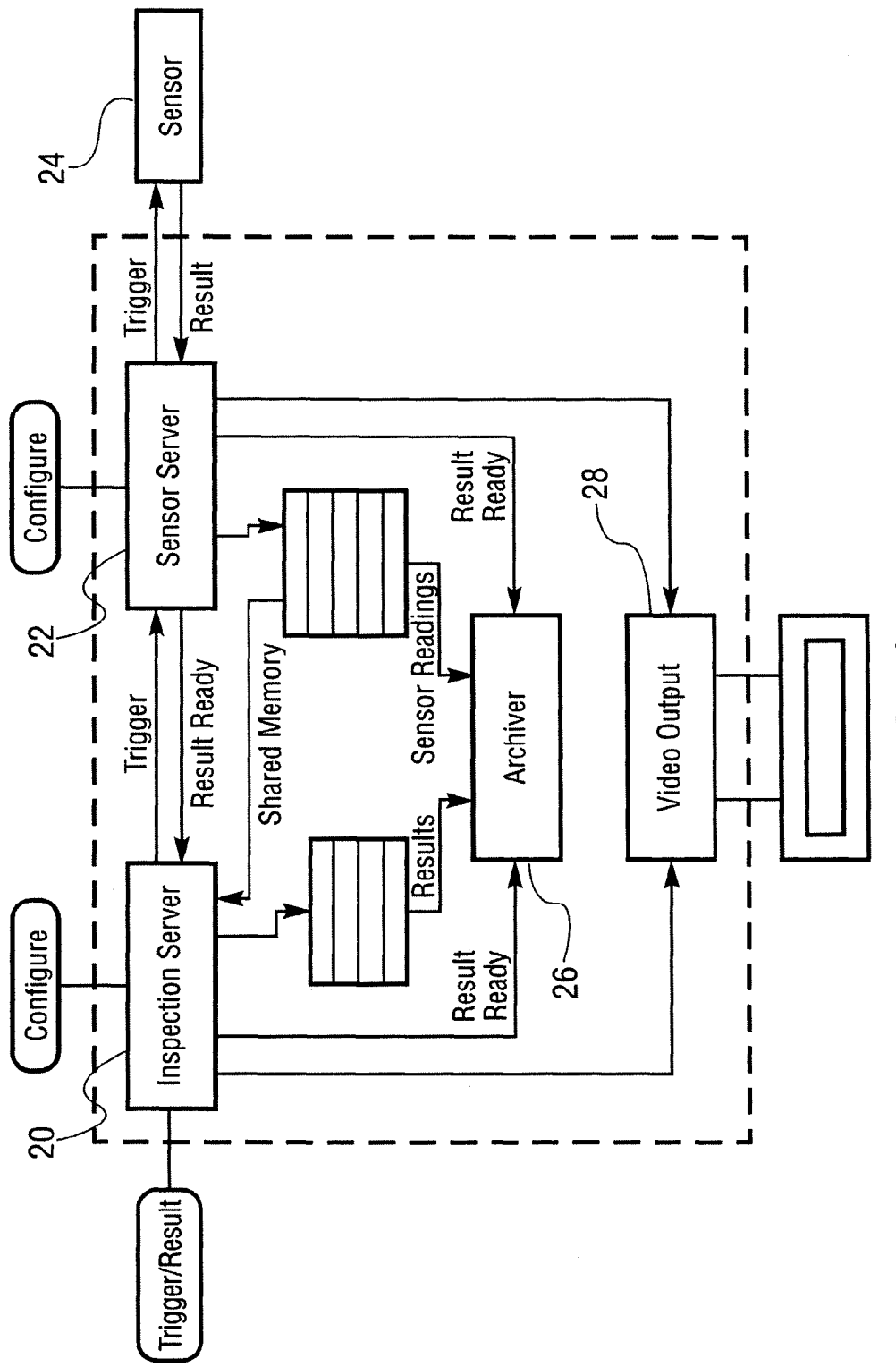
FIG. 1 is a schematic diagram illustrating an example system according to one implementation of the invention.

DESCRIPTION OF EXAMPLE
EMBODIMENT(S)

A. Overview of Pattern Recognition

Generally, pattern recognition involves generation of input vectors potentially through feature extraction, and comparison of the input vectors to a set of known vectors that are associated with categories or identifiers. One finds example logic for pattern identification and pattern recognition in the following five patents, whose disclosures are hereby incorporated by reference: U.S. Pat. Nos. 5,621,863; 5,701,397; 5,710,869; 5,717,832; and 5,740,326.

A vector, in one implementation, is an array or 1-dimensional matrix of operands, where each operand holds a value. Comparison of an input vector to a known vector generally involves applying a distance calculation algorithm to compute the individual distances between corresponding operands of the input vector and the known vector, and in accordance to the distance calculation algorithm in use to combine in some fashion the individual distances to yield an aggregate distance between the input vector and the known vector(s). How the aggregate distances are used in recognition operations depends on the comparison technique or methodology used to compare input vectors to known vectors. There are a variety of ways to compare vectors and to compute aggregate distance. In some implementations, the resulting aggregate distance may be compared to a threshold distance (such as in the case of Radial Basis Functions). In other implementations, the aggregate distance can be used to rank the respective matches between the input vector and the known vectors (such as in the case of K Nearest Neighbors (KNN)). Selection of vector layout, comparison techniques and/or distance computation algorithms may affect the performance of a pattern recognition system relative to a variety of requirements including exact or proximity matching, overall accuracy and system throughput.

Using pattern identification and recognition, it is possible to recognize unknowns into categories. A system can learn that multiple similar objects (as expressed by one or more vectors) are of a given category and can recognize when other objects are similar to these known objects. In some implementations, input vectors having known categories can be provided to a pattern recognition system to essentially train the system. In a particular implementation, a knowledge element is (at a minimum) a combination of a vector and an associated category. As discussed in more detail below, a knowledge element may include other attributes, such as arbitrary user data and influence field values. The knowledge elements may be stored in a memory space or knowledge element array, which as discussed below may be partitioned in a configurable manner. A knowledge map is a set of knowledge elements. In some implementations, a knowledge element, in addition to defining a vector and a category, may further be instantiated as a physical processing element (implemented, for example, in a logic processing unit of a Field Programmable Gate Array (FPGA) that encapsulates processing logic that returns a match result in response to an input data vector.

Data vectors form the basis for the knowledge elements stored in the knowledge map as their operands are the coordinates for the center of the element in n-dimensional space. These data vectors can be derived from analog data sources (such as sensors) or can be based on existing digital data (computer database fields, network packets, etc.). In the case of all analog data sources and some digital data sources, one or more feature extraction processes or techniques can be used in order to provide a data vector compatible with the knowledge map used by the pattern recognition system.

Pattern recognition systems can determine the category of an unknown object when it is exactly the same or "close" to objects they already know about. With a Radial Basis Functions (RBF)-based or similar technique, for example, it is possible for a machine to recognize exact patterns compared with the existing knowledge or similar (close) patterns given the objects defined by knowledge elements in the knowledge map. Further, the systems can expand their knowledge by adding a new instance of a knowledge element in a category (as defined by one or more input vectors), if it is sufficiently different from existing knowledge elements in that category.

For didactic purposes, pattern recognition using Radial Basis Functions (RBFs) is described. As disclosed in the patents identified above, there exists a class of algorithms termed Radial Basis Functions (RBFs). RBFs have many potential uses, one of which is their use in relation to Artificial Neural Networks (ANNs), which can simulate the human brain's pattern identification abilities. RBFs accomplish their task by mapping (learning/training) a "knowledge instance" (knowledge vector) to the coordinates of an n-dimensional object in a coordinate space. Each n-dimensional object has a tunable radius—"influence distance" (initially set to a maximum [or minimum] allowed value)—which then defines a shape in n-dimensional space. The influence distance spread across all n-dimensions defines an influence field. In the case of a spherical object, the influence field would define a hypersphere with the vector defining the object mapped to the center. The combination of a vector, the influence distance and a category makes up the core attributes of a knowledge element.

Multiple knowledge elements of the same or differing categories can be "learned" or mapped into the n-dimensional space. These combined knowledge elements define an n-dimensional knowledge map. Multiple knowledge elements may overlap in the n-dimensional space but, in some implementations, are not allowed to overlap if they are of different categories. If such an overlap were to occur at the time of training, the influence distance of the affected existing knowledge elements and the new knowledge element would be reduced just until they no longer overlapped. This reduction will cause the overall influence fields of the knowledge elements in question to be reduced. The reduction in influence distance can continue until the distance reaches a minimum allowed value. At this point, the knowledge element is termed degenerated. Also, at this point, overlaps in influence fields of knowledge elements can occur.

For pattern recognition, an unknown input vector computed in the same fashion as the vectors of the previously stored knowledge elements is compared against the n-dimensional shapes in the knowledge map. If the unknown data vector is within the influence fields of one or more knowledge elements, it is termed "recognized" or "identified." Otherwise it is not identified. If the unknown vector is within the influence field of knowledge elements within a single category, it is termed "exact identification". If it falls within the influence fields of knowledge elements in different categories, it is termed "indeterminate identification".

As discussed above, to process object influence fields and to determine which one of the three result types (exact recognition, not recognized, indeterminate recognition) occurred in recognition operations, a distance can be calculated to facilitate the required comparisons. The data vector format should be compatible and linked with the distance calculation method in use, as is indicated by the formulas shown below. In practice it is computationally more expensive to use hyperspheres (Euclidian distances) to map the knowledge elements, as the corresponding distance calculations require more time-consuming operations. In these cases, the knowledge element can be approximated by replacing a hypersphere with a hypercube, in order to simplify the distance calculations.

The classic approach focuses on two methods, $L_1$ and $L_{sup}$, to approximate the hypersphere with a value easier to compute (a hypercube). $L_1$ is defined as $$\sum_{i=0}^{n} = |DEVi - TVi|,$$

and $L_{sup}$ is defined as $|DEVi-TVi|max$, where DEVi is the value of vector element i of the knowledge element's vector and TVi is the value of vector element i of the input vector. $L_1$ emphasizes the TOTAL change of all vector element-value differences between the object's knowledge vector and the input vector. $L_{sup}$ emphasizes the MAXIMUM change of all vector element-value differences between the knowledge element vector and the test vector. However, as described further below, the pattern recognition system allows the use of other distance calculation algorithms, such as Euclidian geometry (true hypersphere) in addition to the $L_1$ and $L_{sup}$ methods.

A pattern recognition engine can be built to implement a RBF or other comparison technique to define knowledge maps, as described above, and different recognition system configurations. Besides comparison technique, key determinates of such an engine are the number of knowledge elements available, width of the data vector supported by the objects, the width and type of the vector operands, the distance calculation methods supported and the number of possible categories the machine can support. Moreover, a computerized machine can be built to define knowledge maps using Bayesian functions, linear functions, etc as the comparison techniques. The pattern recognition system described here can be implemented using any such functions. That is, the RBF implementations described here are only representative.

B. Partition-Based Pattern Recognition System

Particular implementations of the present invention provide a highly-configurable pattern recognition system where a set of pattern recognition system attributes (such as vector attributes, comparison techniques, and distance calculation algorithms) can be configured as a so-called partition and selected as needed by a pattern recognition application. In some implementations, the memory space that stores knowledge elements can be partitioned, and a variety of pattern recognition system attributes can be dynamically defined for one or more of the partitions. In one implementation, a pattern recognition engine, such as hardware or a separate software module, maintains the knowledge maps and partitions, while a pattern recognition application accesses the knowledge maps by passing commands to the partition, such as configure, learn and recognize commands. In one implementation, the pattern recognition engine provides a set of application programming interfaces (APIs) that allow applications to define and configure partitions, as well as invoke corresponding partitions for learn and recognize commands.

A partition may include one or more of the following configuration parameters: 1) number of vector operands; 2) vector operand type; 3) vector operand width; 4) comparison technique; 5) distance calculation technique; and 6) maximum number of knowledge elements. A partition may also include additional parameter attributes that depend on one of the foregoing attributes. For example, if RBF is selected as the comparison technique, the initial influence field can be a capped maximum value (MAX Influence—the largest hypersheres or hypercubes) or a smaller value which is the distance to the nearest neighbor of the same category or another category. These influence fields can be reduced as additional knowledge is "learned" which is not in the same category, but within the current influence field of an existing knowledge element. In addition, since a partition identifies a comparison type, one or more learning operations may also be affected. For example, if KNN is selected for the comparison type, learned vectors may be simply stored in the knowledge map without checking to determine whether a new knowledge element vector overlaps an influence field of an existing vector, as influence fields are not part of the KNN algorithm.

As discussed above, a pattern recognition engine maintains a knowledge element array which is a memory space for one or more knowledge maps. Each knowledge map includes one or more knowledge elements, which itself includes a vector, and a category identifier. The system allows for partitioning of the number of available knowledge elements to enable concurrent sharing of the pattern recognition resources. This supports multiple users of the knowledge map functionality, or supports a knowledge map application that wants to use it in different ways (e.g., different feature extraction techniques, different initial maximum influence value, different minimum influence value, different distance calculation method). For example, in a vision application one partition might be used for gradient analysis, whereas another partition of the knowledge element array might be used for histogram analysis. The results returned from each partition might be combined in several application-specific ways to achieve a final-recognition result.

A pattern recognition application can invoke a particular partition by identifying the partition when passing a learn, configure, or recognize command to the knowledge element array. The pattern recognition functionality may return results including an identified category, as well as other data configured or associated with the category or a matching knowledge element(s). In one implementation, the pattern recognition engine can be configured to remember the partition identifier of the last command passed to it and apply the last-identified partition to subsequent commands until a new partition is identified.

An overall pattern recognition process may be defined or configured as a series or set of individual pattern recognition operations, each associated with a configured partition. In one implementation, the pattern recognition application can include decisional logic that effectively arranges the partitions in a serial or hierarchical relationship, where each partition can be included in a decisional node including other logic or operations that is traversed during a pattern recognition operation. Traversing the partitions can be done by a host processor, or can be offloaded to a co-processor, or even programmed into a programmable logic circuit, such as an FPGA.

B.1. Partitions—Data Vectors and Operands

In the prior art, the width of the knowledge vector was fixed. This causes two problems. First, in situations where the input knowledge is smaller than this fixed width, resources are wasted as the full width of the neuron array is not used for each neuron. In some cases this can be dramatic (e.g., a 5-byte input vector being stored in a 64-byte vector width which is fixed). Second, in other situations, the input knowledge might have a natural width wider than the fixed vector width. This could cause loss of fidelity as the data must be scaled down to fit into the vectors. In the pattern recognition system described herein, the width of the knowledge vector of the knowledge elements and test vectors is not fixed. Multiple vector widths (such as 1-, 2-, 4-, 32-, 64-, 128-, 256-byte words) are available to suit the knowledge provided by the application or feature extraction processes. With smaller vector widths, more knowledge elements are available using the same memory resources.

Figure 6:
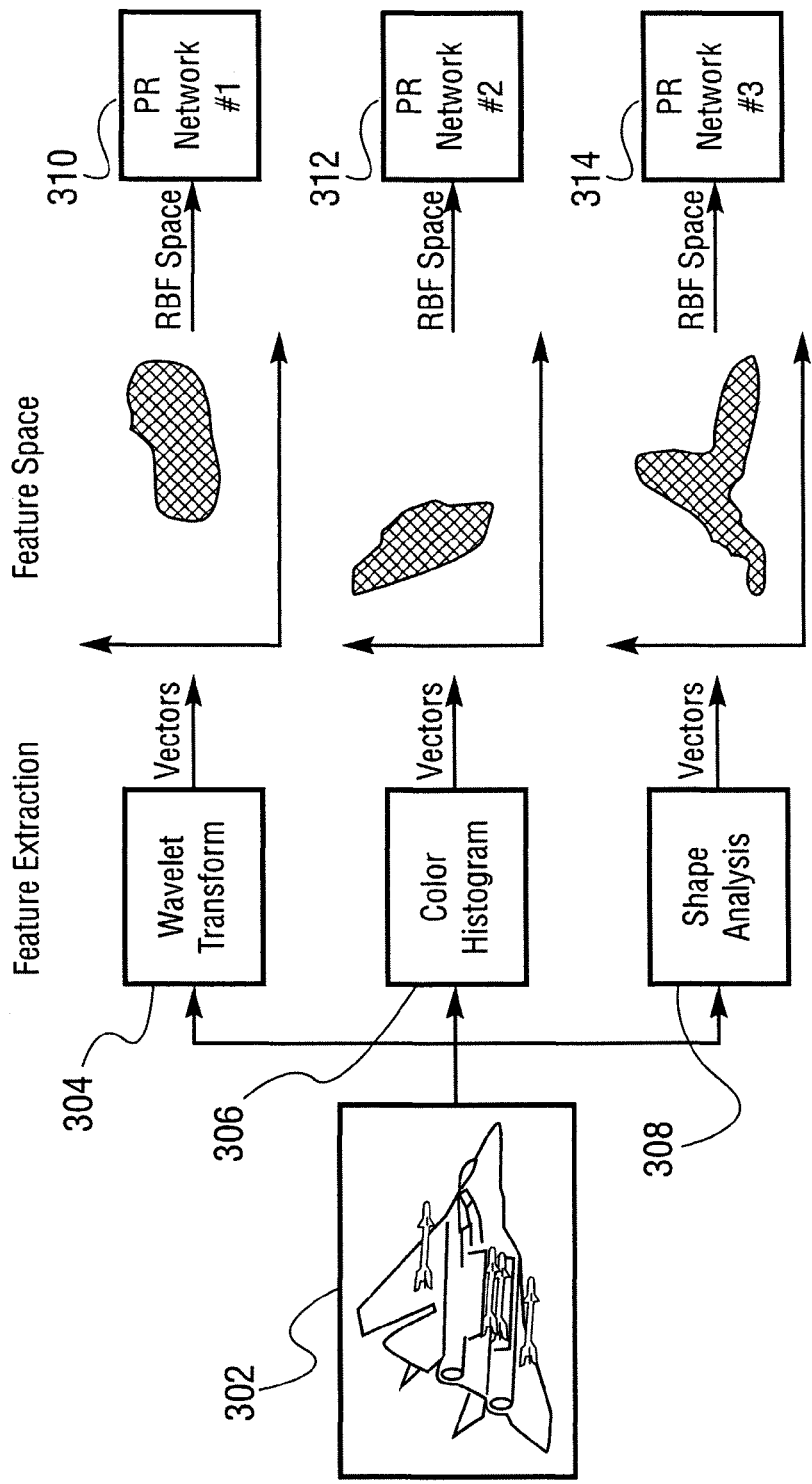
FIG. 6 is a flow diagram illustrating multiple feature extraction processes applied to an input.

Still further, the pattern recognition system can be used with a variety of supported data types. Knowledge elements and test vectors can be represented with a data vector having operands or vector elements of a variety of widths (as described above) and data types (such as unsigned bytes, signed bytes, unsigned N-bit integers, signed N-bit integers, floating point values, and the like). A given data vector can be generated from already digitized information or information that being fed directly from a sensor. The sensor-based information may be first processed by a feature extraction process (as well as other processes), as shown in FIG. 6. FIG. 6 illustrates a plurality of feature extraction processes 304, 306 and 308 can process a given input data set 302, such as in image captured by an image sensor, to yield corresponding n-dimensional vectors positioned in their respective feature spaces. For example, a color histogram feature extraction process 306 may yield an n-dimensional vector, where n is defined by the number of color bins of the color histogram and the value of each operand is the number of pixels that fall into each respective color bin. Other feature extraction processes may yield or require vectors having a different number of operands, and operand types (such as different widths and data types). As FIG. 6 illustrates, each of the resulting data vectors can be applied to a corresponding pattern recognition network 310, 312 and 314, each contained within a partition and each including a knowledge map for training/learning and/or pattern recognition operations. In one implementation, a partition may be configured for each feature extraction process, where the number and type attributes of the vector elements are defined based on the requirements or properties of each feature extraction process. For example, the wavelet transform process 304 may require that a data vector having 15 elements or operands, each having an 8-bit width are configured. The color histogram process 306 may require a data vector with 30 operands or elements, each having a 32-bit width.

B.2. Partitions—Comparison and Distance Calculation Techniques

As discussed above, a partition may be configured that identifies a comparison technique used to compare an input (test) data vector and a known vector of a knowledge element. Selectable comparison techniques include Radial Basis Functions, K Nearest Neighbor functions, Bayesian functions, as well as many others described in scientific literature Additionally, after a comparison technique is selected, one or more technique specific parameters may be configured (such as maximum and minimum influence fields for RBF comparisons). Further an interface is defined so that users of the pattern recognition system can build their own pluggable comparison technique modules, if those provided by the pattern recognition system are not sufficient. Additionally, if one or more applications with different needs are using the knowledge element array, one could set up each partition to use different pluggable comparison technique modules.

Still further, the algorithm for computing the distance between an input vector and a known vector can also be configured. For example, one from a variety of algorithms can be selected, such as Euclidian distance, $L_1$, $L_{sup}$, linear distance and the like. As discussed above, however, $L_1$ and $L_{sup}$ are approximations of the true hyper-spatial distance which would be calculated using Euclidian geometry. In the pattern recognition system according to various embodiments of the invention, the math for doing distance calculation is "pluggable." This means that a given application can determine which math modules are available and request the one appropriate for its needs in terms of natural distance calculation, e.g., a module that uses Euclidian geometry and floating point numbers. Further an interface is defined so that users of the pattern recognition system can build their own pluggable distance calculation modules, if those provided by the pattern recognition system are not sufficient. In this manner, a user can set the width of the individual components of their input vectors, treat them as the appropriate data type (integer, floating point, or other) and can apply any distance-calculation algorithm that they desire or that the pattern recognition system chooses to provide. Additionally, if one or more applications with different needs are using the knowledge element array, one could set up each partition to use different pluggable distance calculation modules.

B.3. Partitions—Weighting & Masking

In the prior art, there was no way to mask off portions of the existing knowledge of a vector or to weight different parts of the trained knowledge element vector as might be needed on subsequent recognition operations. For example, a set of knowledge elements might be trained on an entire image, but in some subsequent recognition operations only the center of the images might need to be taken into consideration. In the pattern recognition system according to one implementation, mask vectors and/or weighting vectors can be used when matching against an existing knowledge base. In one implementation, masking and weighting of operand vectors is part of a recognition operation. In one implementation, an application may cause the pattern recognition engine to mask a vector operand by identifying a partition and the operand(s) to be masked in a mask command. An application may cause the pattern recognition engine to weight vectors operands by issuing a weight command that identifies a partition, the operands to be weighted, and the weighting values to be used. In one implementation the active influence field of a knowledge element may be temporarily increased or decreased to account for masking vectors or weighting vectors that may be currently in use.

B.4. Partitions—Higher Level Recognition Operations

Partitions can be configured and arranged in a hierarchy or other structured relationship (series, parallel, branching, etc.) to provide for solutions to complex pattern recognition operations. A pattern recognition application, for example, may define an overall pattern recognition operation as a set of individual pattern recognition operations and include decisional logic that creates a structured relationship between the individual pattern recognition operations. In such an implementation, the results returned by a first set of partitions can be used as inputs to a second, higher level partition. For didactic purposes, the decisional logic can be considered as a set of decisional nodes and a set of rules and processing operations that define relationships between decisional nodes.

A decisional node, in a particular implementation, may comprise configured logic, such as computer readable instructions, that includes 1) operations applied to one or more inputs prior to calling a pattern recognition engine; 2) calls to one or more partition-based recognition operations implemented by a pattern recognition engine, and/or 3) operations applied to the results returned by the pattern recognition engine. The decisional node may make calls to one or more partitions maintained by the pattern recognition engine. The additional logic of a decisional node can range from simple Boolean operations to more complex operations, such as statistical analysis and time series analysis. Furthermore, the operations responding to the results of pattern recognition operations can select one or more additional decisional nodes for processing.

In particular implementations, a decisional node can be implemented as a decisional node object, which is an instantiation of a decisional node class in an object-oriented programming environment. In such an implementation, the class can encapsulate one or more partition operations (as corresponding API calls to the pattern recognition engine). The decisional nodes can be sub-classed to develop a wide array of decisional nodes. As discussed above, additional logic can be developed to establish relationships between decisional nodes as well, and can be configured to interact with other decisional nodes or user level applications to achieve complex, high order processing that involves pattern recognition. For example, in one implementation, a decisional node could be implemented as a finite state machine whose output could change as inputs are provided to it and the results of recognition operations are returned. The resulting state of the finite state machine, at any given time, can be an input to a higher level decisional node, which itself may encapsulate one or more partition operations as well as additional processing logic.

Processing operations associated with a decisional node or a configured set of decisional nodes can be implemented in a variety of manners. Partition operations can be performed by a pattern recognition engine (implemented as a separate thread or process of a general purpose computer, offloaded to a co-processor, and/or implemented in a programmable logic circuit), while the decisional nodes can be implemented as a series of programming instructions associated with a user level application. In other implementations, processing of the decisional nodes can also be offloaded to a co-processor, and/or implemented in a programmable logic circuit.

Figure 19:
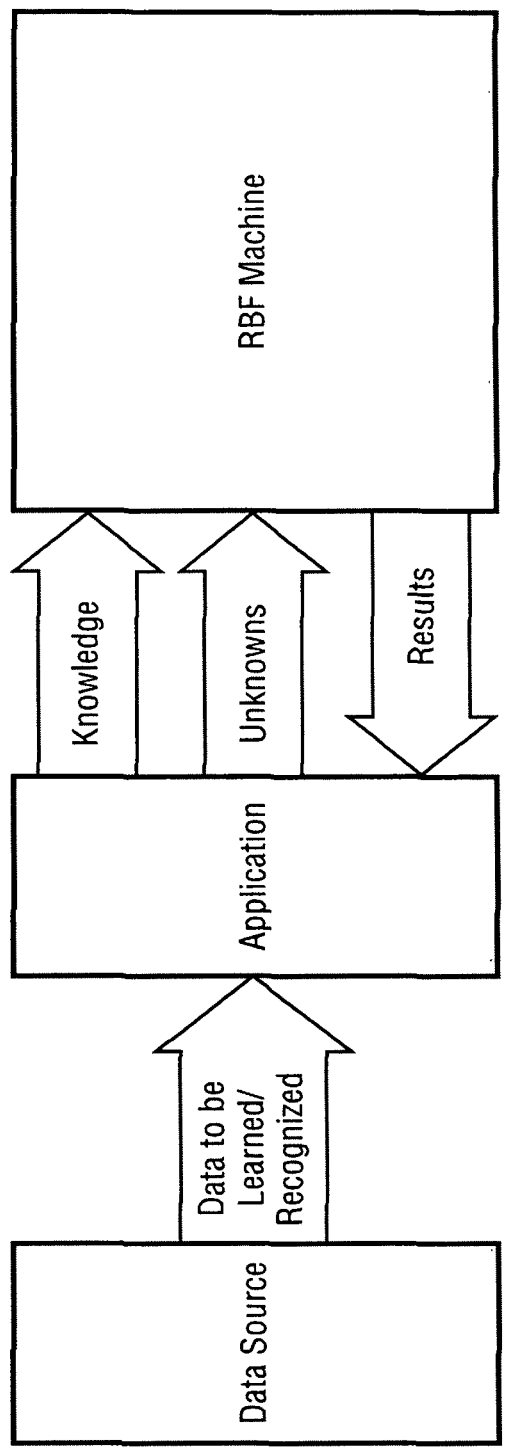
FIGS. 19 and 20 are schematic diagrams illustrating interaction of pattern recognition system components.

In the prior art, either a single recognition machine is used to identify a certain category of object or multiple recognition machines are used to identify an object when a majority vote wins. For example if two out of three recognition machines returned the same result, the object would be identified as that result. Further, in the existing prior art and scientific literature, RBF machines are used in a flat arrangement, as shown in FIG. 19. However there are large numbers of pattern identification problems where a flat arrangement cannot provide the desired results. These are normally situations where there is a large amount of detail (background and foreground) of different data types that must be processed in order to determine a final pattern recognition result. For example, one might apply a certain technique to input data and, if a match is found, then one might feed different data (based on the first match) calculated by a different technique into another recognition operation to determine a "higher level" recognition result.

Using the foregoing, a pattern recognition application can be configured to support a set of pattern recognition operations arranged in a hierarchy or other structured relationship that can be traversed to achieve a final recognition result. For example, a hierarchical configuration of pattern recognition operations can be configured where each decisional node of the hierarchy (pattern recognition partition(s) along with optional control/temporal logic) can identify a subsequent path to take. The results associated with one operational node of the hierarchy can be used to decide the next operational node to be executed and/or can be an input to a subsequent operational node. For example, the results of a first set of partition operations can become through combinational techniques, the input vector to a second, higher level partition or node operation.

Figure 20:
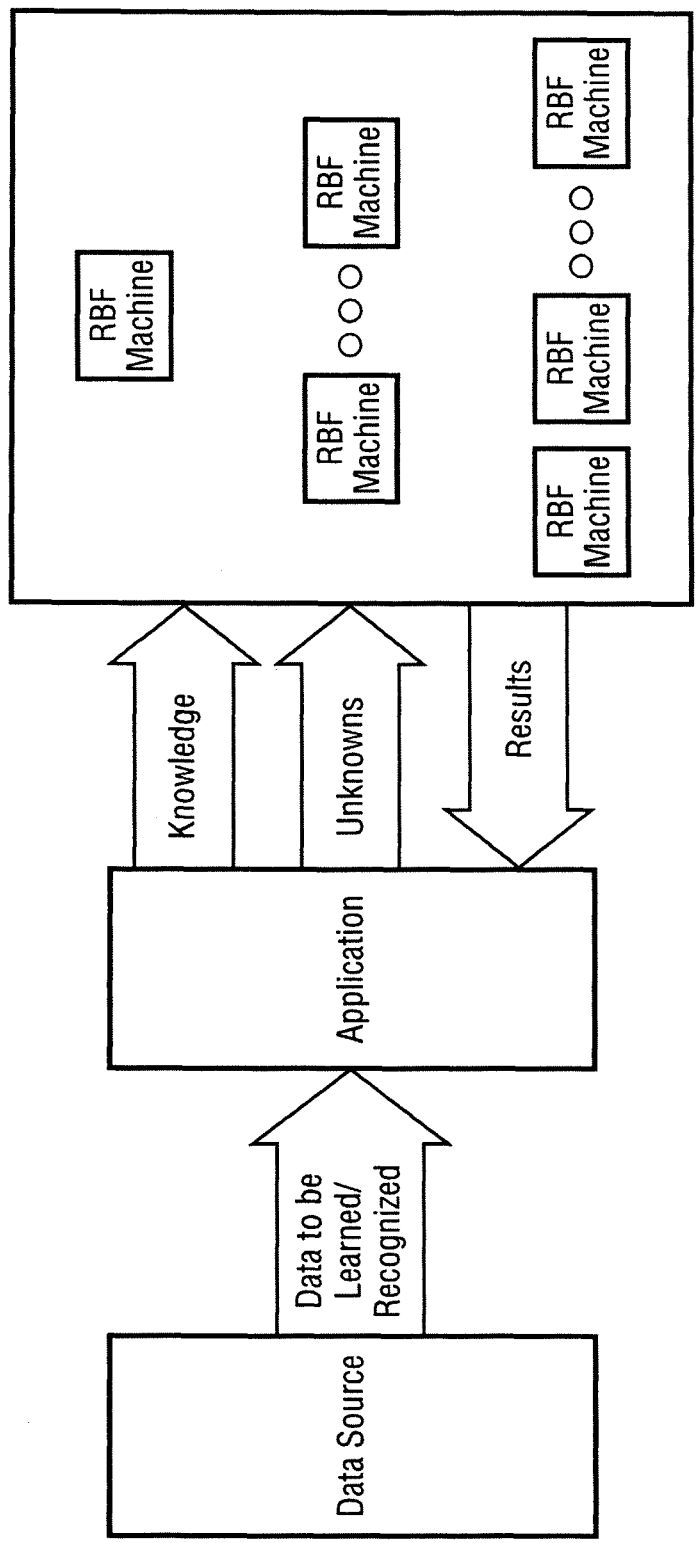

FIG. 20 illustrates a hierarchical recognition system, according to one implementation of the invention. A hierarchical recognition system, in one implementation, leverages the pattern recognition system's capabilities described here, including its capabilities with respect to opaque user data (as described in detail below), its partitioning capabilities, and/or its masking capabilities. When a knowledge map is taught a vector/category combination, the knowledge map allows opaque user data to be stored with knowledge elements as they are trained. The knowledge element/map does not process this information. It simply stores it and returns it to the application/user when the knowledge element is matched in a subsequent recognition operation. This opaque user data can be used for lookups (e.g., a key) or other user-defined purpose. This capability could be used to answer the question of why a certain vector fell into a specific category as the opaque data value returned could be used to look up the original training vector (and its source, e.g., picture, sounds, etc.) to present to a user or for use in an auditing application.

The opaque user data of multiple recognition operations could be used as an input vector (via combinatorial logic) to a higher level partition/node, or could also be used to lookup a data vector that could be used as an input vector (via combinatorial logic) to a higher level partition/node. In other implementations, the opaque user data could be used to look up a partition or decisional node to be processed next in a multiple layer pattern recognition application. For example, one recognition stage could use a first partition to provide a result. Via the use of opaque user-data, a subsequent recognition stage, using the same or a different input vector, could be performed in a different partition based on the opaque user data returned by the first recognition stage. This can continue for several levels. Additionally, once a higher level recognition result is achieved, it could be used to weight or mask additional recognition operations at lower levels in the hierarchy, such as to bias them toward the current top-level recognition.

Thus, a pattern recognition application may use multiple partitions or nodes to create the layers or it may create multiple independent layers and connect them as needed. The application decides which partitions/nodes are to be in which layers. To use such a pattern recognition system, the application trains specific knowledge elements with corresponding opaque user data (see above and below) into specific partitions. In the more simplistic case, a given unknown pattern may be presented to the appropriate partitions and the recognition result of each partition (combination of category recognized and/or opaque user data and/or derived data from the opaque user data), if any, would be fed to higher layers in the hierarchy. This process would repeat until a final recognition result was derived at the top of the hierarchy.

An example of this would be the lowest level of the hierarchy recognizing edges of a shape or sub-samples of a sound. Further up in the hierarchy, lines with intersecting angles would be recognized from image data along with tones from sound data. Still further up in the hierarchy, a four legged mammal would be recognized from the image data and the sound "woof" would be recognized from the sound data. Finally at the top of the hierarchy "dog" could be the final recognition result.

Or consider the following example. An image sensor might be pointed at a scene which includes a wall upon which a TV is mounted. First level pattern recognition might detect the corners and edges of the TV in the middle of their field of view. Once the individual elements were recognized, data associated with this recognition operation (e.g., the opaque user data in the pattern recognition system) might contain data on the position of the recognition in the overall scene (e.g., corner located at 2, 4, 8 and 10 o'clock). Similar results might be obtained for the edges. A higher level of recognition might conclude that these patterns in their respective positions formed a box. Recognition techniques using other different approaches might plot color changes. When these results are combined with all other techniques a final result of TV might be the determination at the top of the hierarchy. Once the TV is recognized, masking or weighting might be applied to lower levels in the hierarchy to focus only on the TV and ignore other objects in the scene being recognized, such as paintings on the wall, flying insects, books on a bookshelf, etc. A practical application of this example would be airport security where once a wanted person was identified by the facial patterns, tone of speech, type of clothing, fingerprint, etc., a computerized system could then "follow" this person throughout the facility continuously recognizing the person while somewhat ignoring the surrounding scene. In addition to the spatial examples defined above, additional levels in the hierarchy could use temporal (times series) pattern recognition operations to define their outputs. The input to these levels would be spatial recognitions that are then trended over time to produce a temporal recognition result.

A permutation on this case is that instead of just using one partition's or node's results to feed to a higher level partition or node, multiple lower level partitions could be combined into recognition units (or nodes). In this fashion probabilistic results can be feed further into the hierarchy. An example would be the lower level results are that there is an 80% probability, as opposed to a binary result in the simpler hierarchy.

Through experimentation, the correct numbers of levels are determined along with what to train/recognize in each level and what to feed up to higher levels. A starting point can be to use different knowledge vector feature extraction techniques at the lowest level and map these different techniques to different partitions/nodes. Next one would feed unknown knowledge vectors to the trained lower level to determine what was recognized. Based on these recognition results, the connection to the next level in the hierarchy would be created along with determining suitable feature extraction algorithms and associated logic for that level. In some cases the original training data would be used with different nth-order feature-extraction algorithms to train higher levels, or the output from the lower level (opaque user data or derived from opaque user data) would be used to train the higher level or a combination of the two. Each recognition problem domain may require experimentation to determine what the proper number of levels is, what the levels should be trained with and how they should be connected.

In the previous example, high fidelity recognition results can be obtained by feeding up through a recognition hierarchy. For time series (or temporal) recognition problems, it is also useful to feed a result from higher levels back to lower levels to bias them for the object being recognized and tracked. As an example, once a dog is recognized as barking, it can be advantageous to focus on the barking dog as opposed to blades of grass blowing in the background. The opaque user data could also be used to bias one or multiple levels of the recognition hierarchy once "sub recognitions" occurred at lower levels in the hierarchy to allow them to help focus the "desired" result.

In order to accomplish this, as each level recognizes a specific pattern, it could provide a bias to its own inputs or feed a bias to a lower level in the hierarchy to bias its inputs. This feedback would be accomplished the same way as the feed forward approach, namely, use (1) the recognition results' opaque user data or (2) what that data points to, to provide a bias to the same or a lower level. This would be accomplished by using the masking or weighting functionality described earlier.

C. Enhancements to Logic for Pattern Identification and Pattern Recognition

As described in the paragraphs below, the system enhances pattern recognition functionality in a variety of manners, in one implementation, making the logic more useful to real-world applications.

Figure 7:
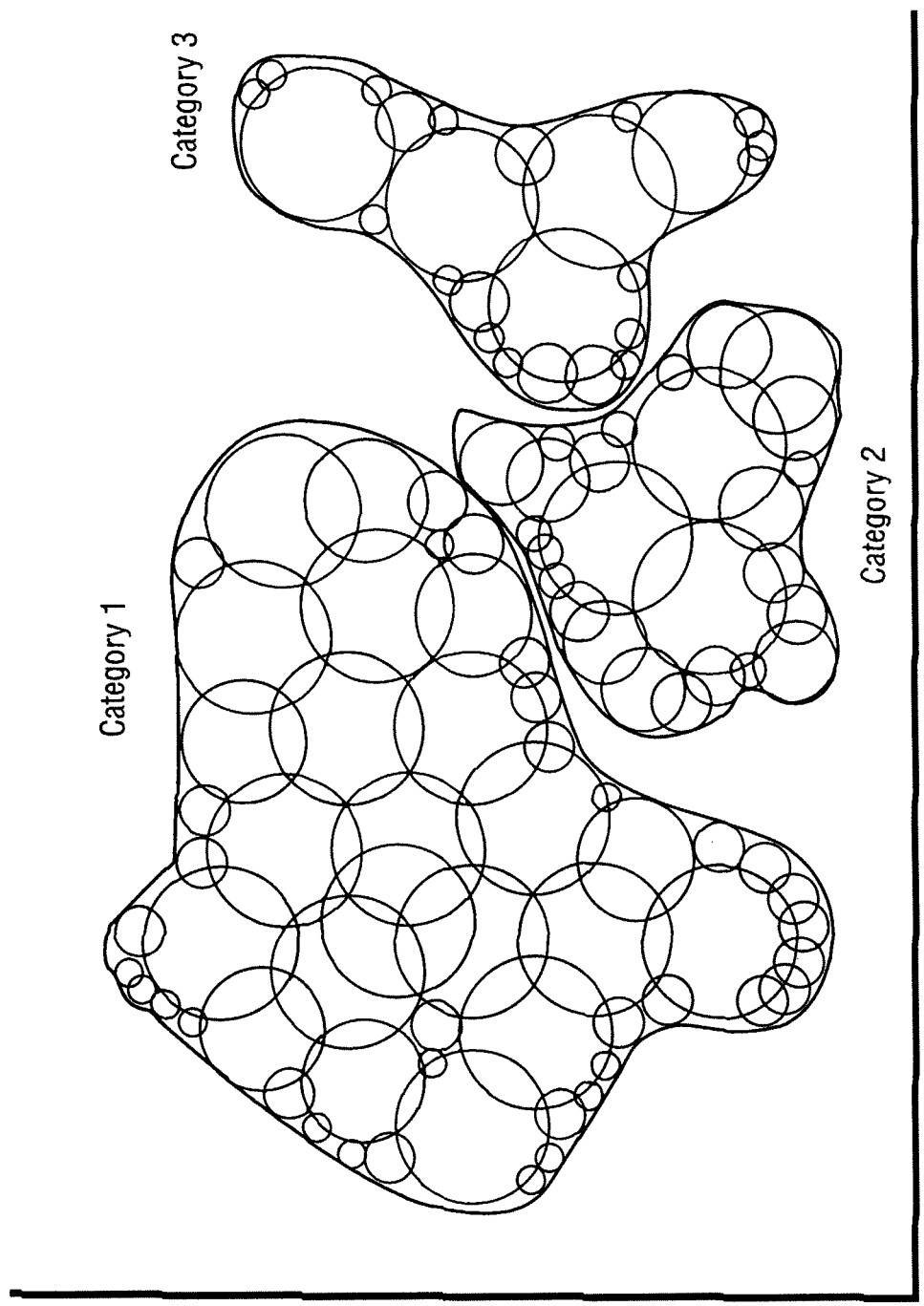
FIG. 7 graphically illustrates a knowledge map for didactic purposes.

FIG. 7 shows an idealized, example pattern recognition knowledge map that might be defined for a two-dimensional (2D) vector type after array training has progressed to a near final state. Three categories have been defined. There is also an "other" category which is implied in the figure. Pattern recognition approximates the "real" knowledge category map (outer black lines) with a plurality of knowledge elements represented as circles in the idealized diagram of FIG. 7). With sufficient training, the difference between the real map and the approximate map can be quite small. In the case of RBF, knowledge elements are allocated to define a point in N-dimensional space, hold an influence field value (radius) and also remember their category (among other attributes). A collection of these knowledge elements in association with a partition is a knowledge map. As a data vector is taught to the knowledge element array (teaching=data vector+category+optional user data+learn command), it is mapped to the appropriate n-dimensional coordinate. If not within the influence of an existing knowledge element, a knowledge element is allocated for the data vector and then an initial influence field is applied along with the given category and optional user data. When this happens the current influence field of other knowledge element may be reduced so no overlap occurs where the categories would be different. In other words, the influence fields of knowledge elements on the boundary of a category in the knowledge map are reduced so as to not overlap with those in a different category. There is an influence field value (MIN Influence) past which the current influence field cannot be reduced. If this happens, the knowledge element is termed "degenerated." Teaching data vectors which are not in a category (i.e., they are in the "other" category) is almost exactly the same (e.g., influence fields of existing knowledge elements may be adjusted), but no new knowledge element is allocated. As explained below, this process is called half-learning.

Figure 8:
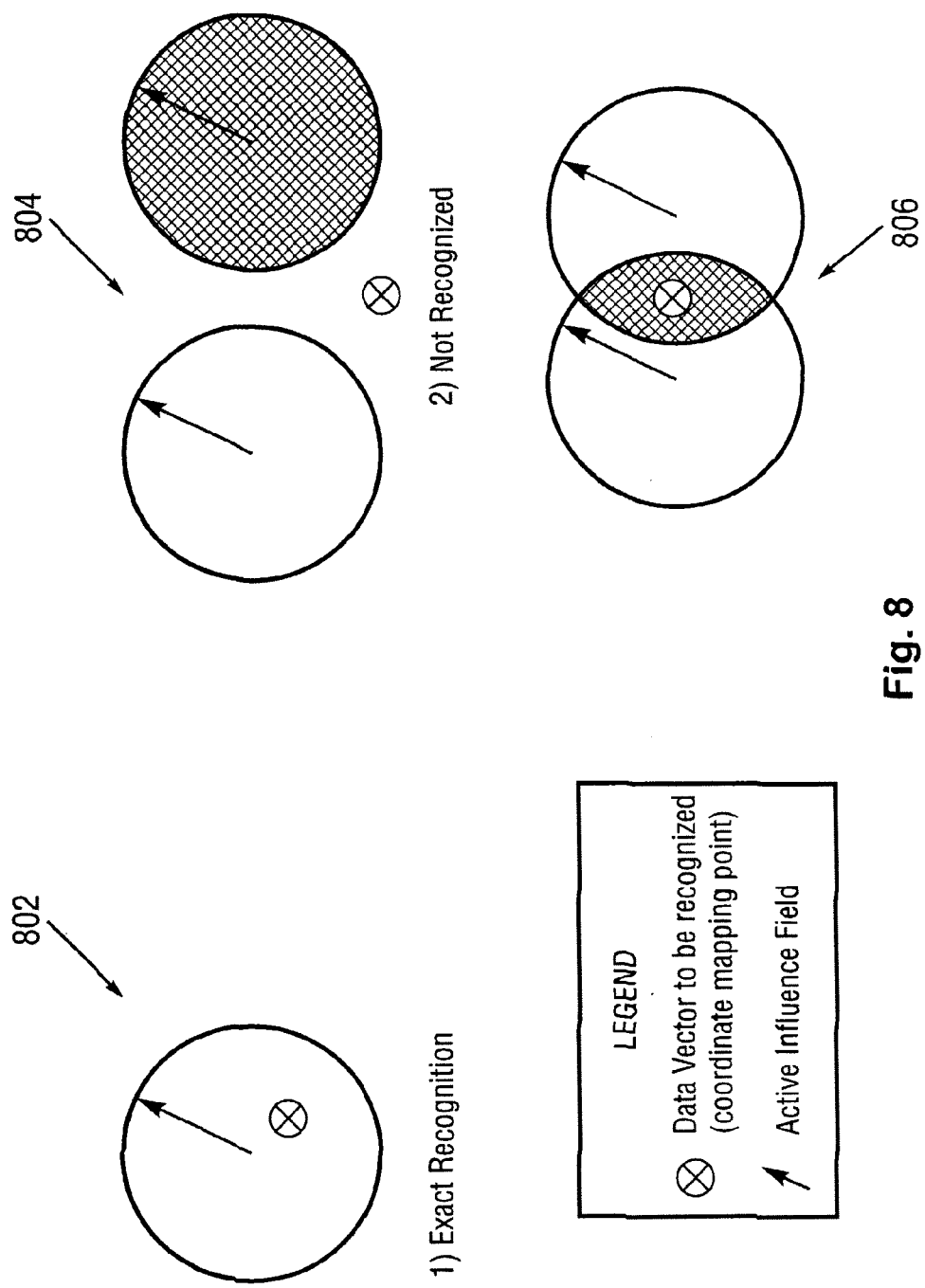
FIG. 8 graphically illustrates matching of input vectors to knowledge elements according to one possible implementation of the invention.

In the recognition phase, input (test) data vectors are presented to the knowledge map and, in one implementation, with a partition identifier. FIG. 8 below shows an example of these three recognition result types. The recognition result can be one of three types:

1. Exact Recognition (802)—The input vector fell within the influence field of knowledge elements of only a single category. The category of these knowledge elements is available to determine the type of information recognized.
2. Not Recognized (804)—The test vector fell outside the influence field of all knowledge elements. This could be a valid result (when an "others" category is appropriate for the knowledge map), or an indication that additional training using the test vector in question is warranted.
3. Indeterminate Recognition (806)—The test vector fell within the current influence fields of more than one knowledge element and those knowledge elements were of different categories. In this case, the category the smallest distance away can be used, the majority category value of the knowledge elements matched can be used, or as with the Not Recognized state, additional training may be warranted.

Figure 9:
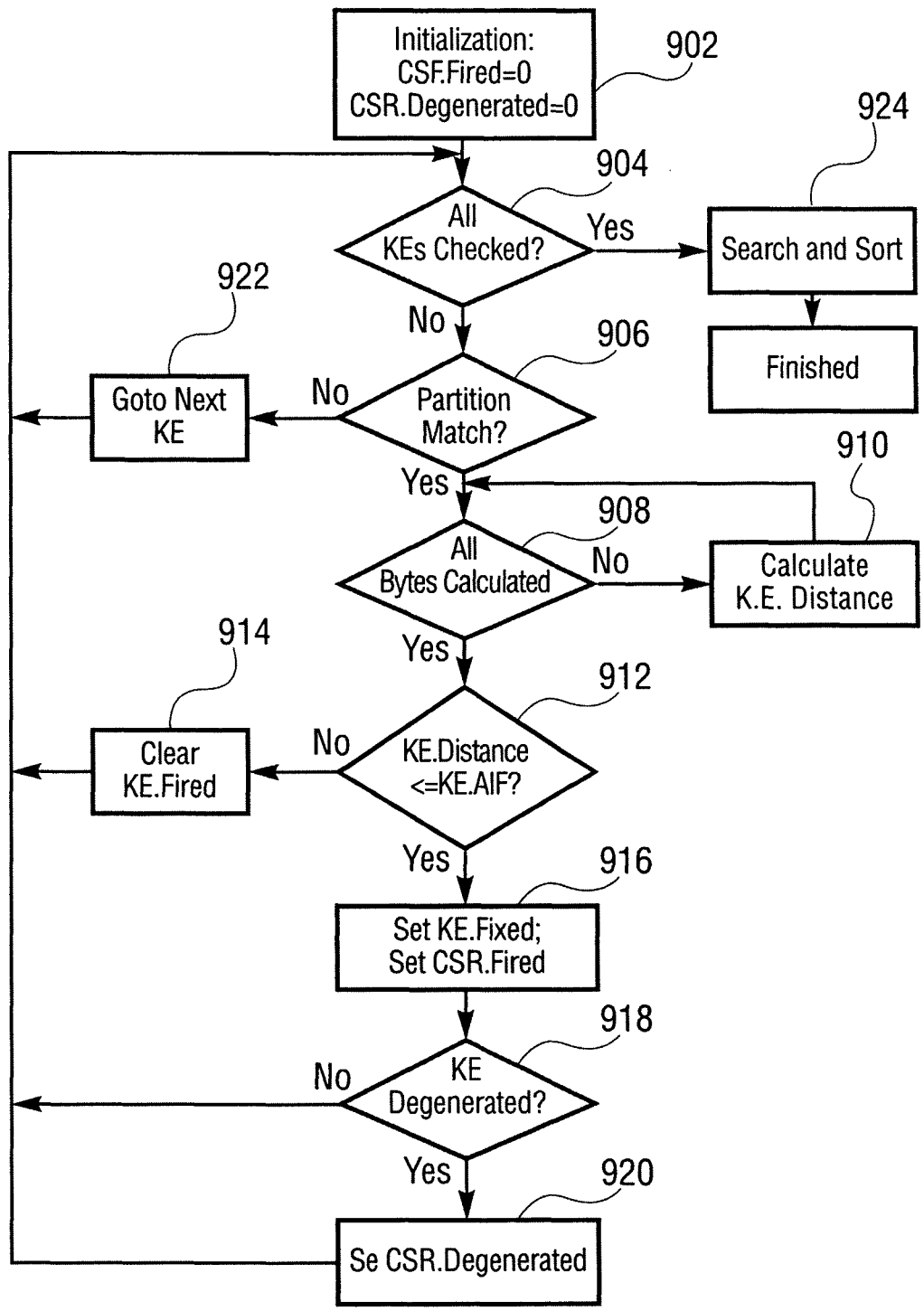
FIG. 9 is a flow chart showing a method directed to matching knowledge elements against input vectors.

FIG. 9 shows an example flowchart of the logic depicted pictorially in FIG. 8. For example, an application may pass a recognize command to a pattern recognition engine identifying an input data vector and a partition. The pattern recognition engine may initialize one or more operational variables (902) and begin processing the input data vector. For example, the pattern processes the input data vector against all knowledge elements (KEs) (904, 922) that correspond to the identified partition (906). As to a given knowledge element, the pattern recognition engine may compute a distance between a first operand of the input vector and the corresponding operand of the knowledge element vector using the distance calculation algorithm of the identified partition, and repeats this process for all operands to compute an aggregate distance (KE.distance) (908, 910). Next, the pattern recognition system determines whether the aggregate distance between the input vector and the knowledge element vector is within the influence field of the knowledge element (912). If not, the pattern recognition system clears the KE.Fired flag that would otherwise indicate a match (914). If so, the pattern recognition engine sets the KE.Fired flag to indicate a knowledge element and category match (916). Additionally, if the knowledge element is a degenerated element (918), the pattern recognition engine sets a degenerated flag (920). In the implementation shown, after or as knowledge element comparison logic is executed, control logic searches the results and sorts the matching knowledge elements by the respective aggregate distances between the input vector and the knowledge element vectors (924). Other implementations are also possible. For example, if KNN is used, the comparison of influence field to aggregate distance would be omitted. In such an embodiment, the top K matching knowledge elements are returned ordered by distance. Still further, if a test vector is matched because it falls within the active influence field of an existing knowledge element, this is a "fuzzy" or "proximity" match. To be an exact match, the test vector would have to be the same (exactly) as the knowledge vector of a knowledge element in the knowledge map. In one implementation, the pattern recognition system allows an application to select proximity (tunable) or exact matching.

C.1. Optimization of Knowledge Vector Fields

In the prior art, an input vector presented for learning would be rejected if it falls within the influence field of an existing knowledge element in the same category. Yet a subsequent learning operation might allocate a knowledge element in another category which could cause the influence field of the original "matched" knowledge element to be reduced such that if the initial input vector was then presented, it would cause a new knowledge element to be allocated.

Figure 10:
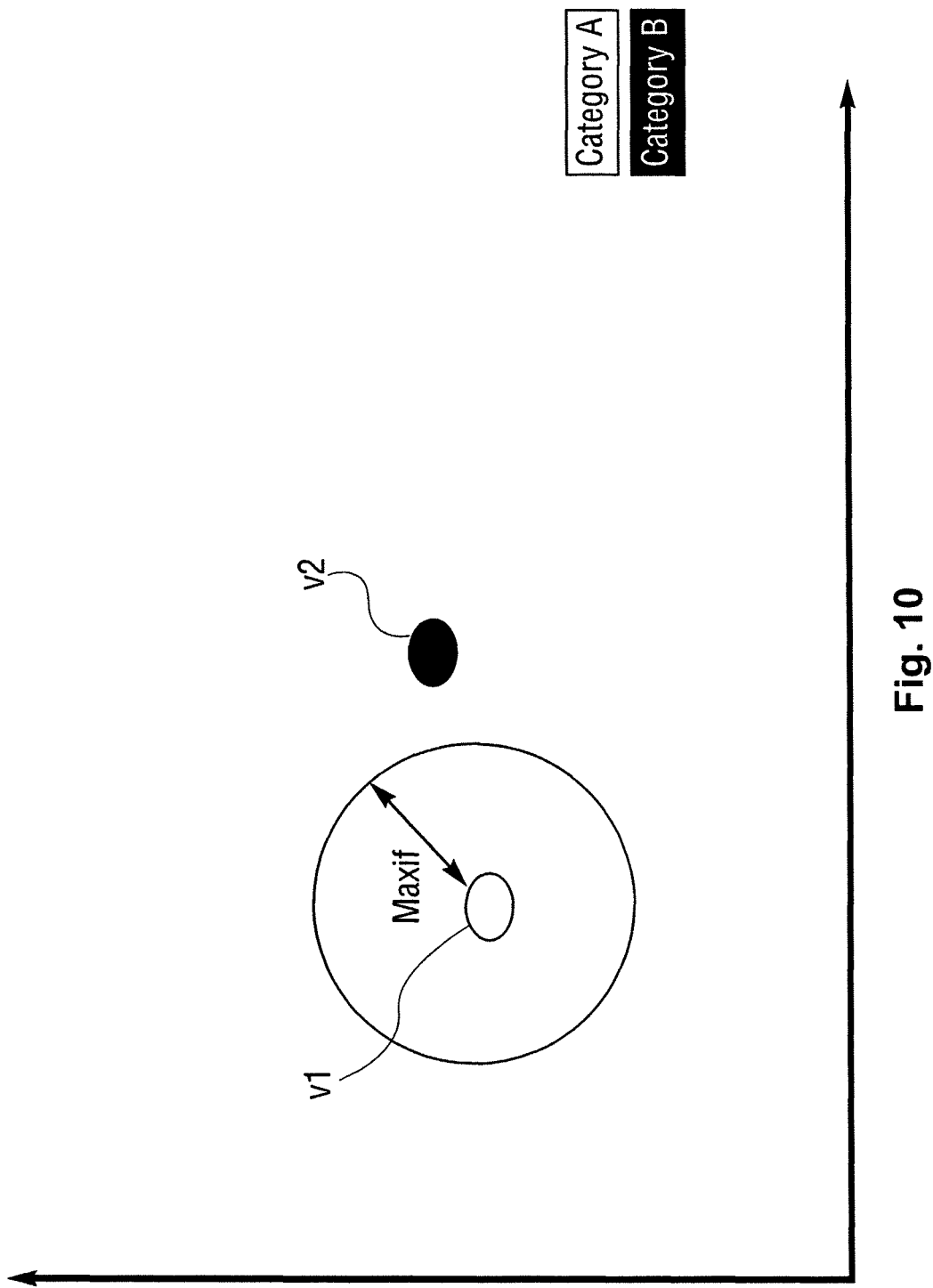
FIGS. 10 thru 16 are charts that graphically illustrate a learning function according to one possible implementation of the invention.
Figure 11:
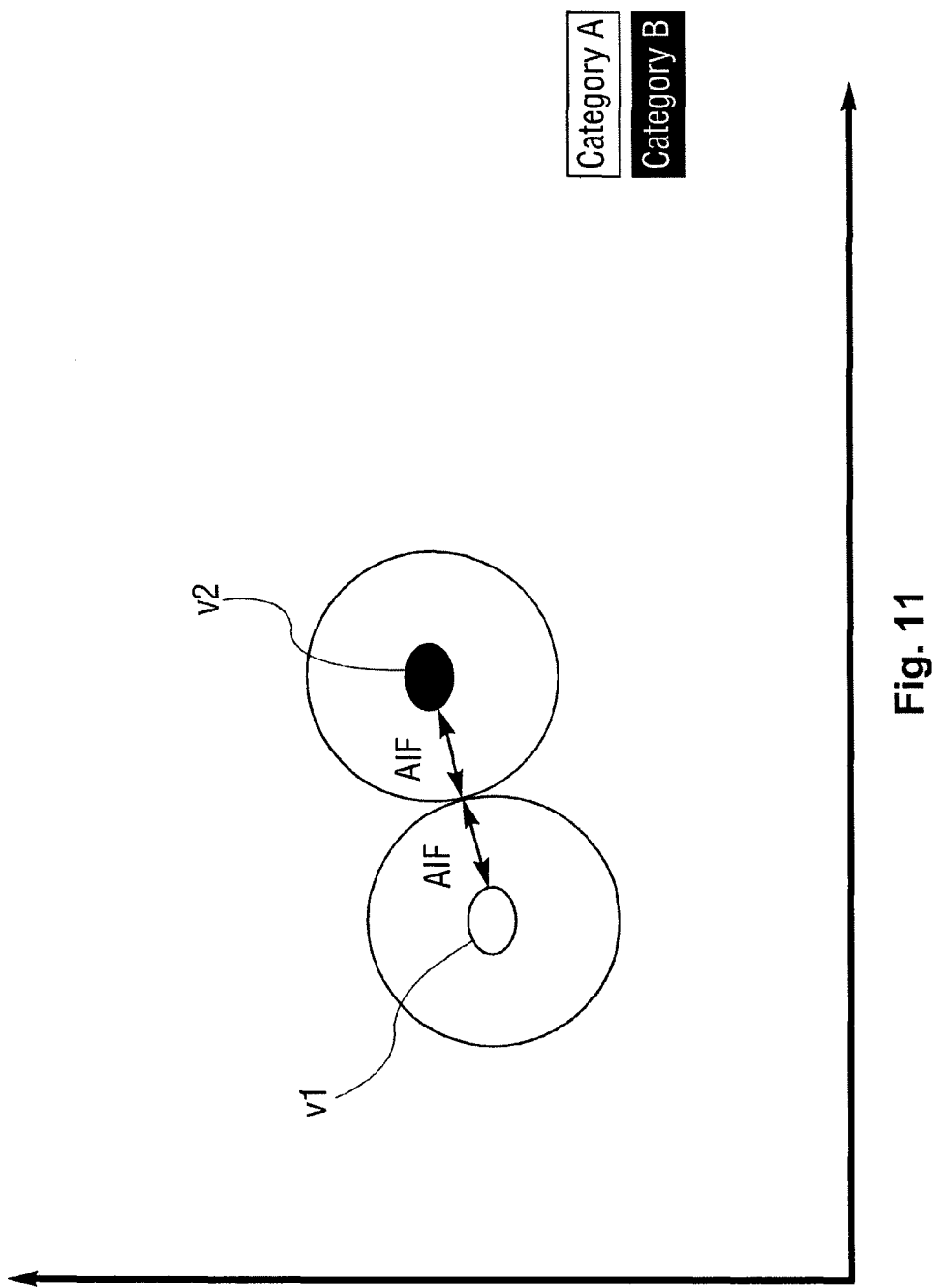
Figure 12:
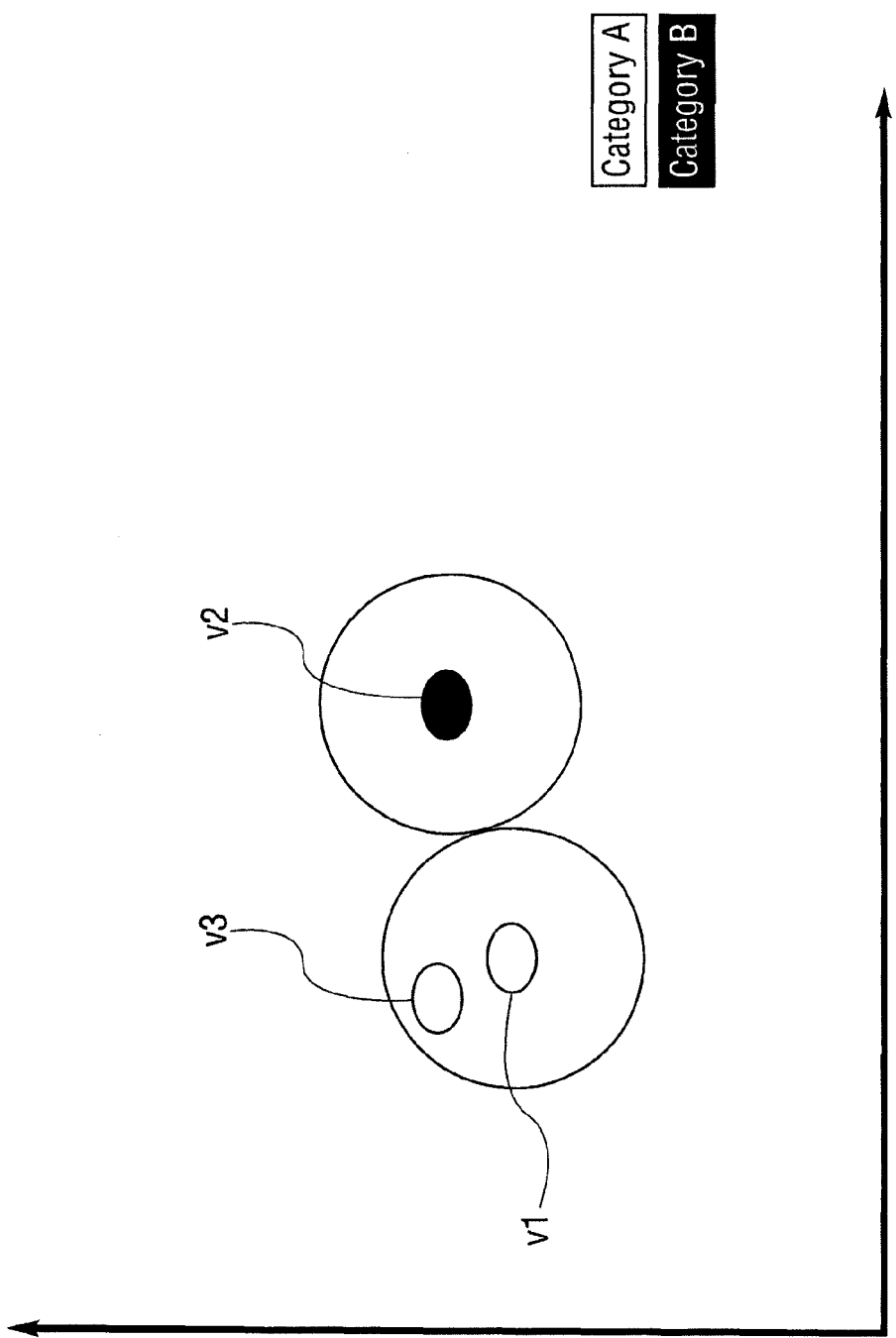
Figure 13:
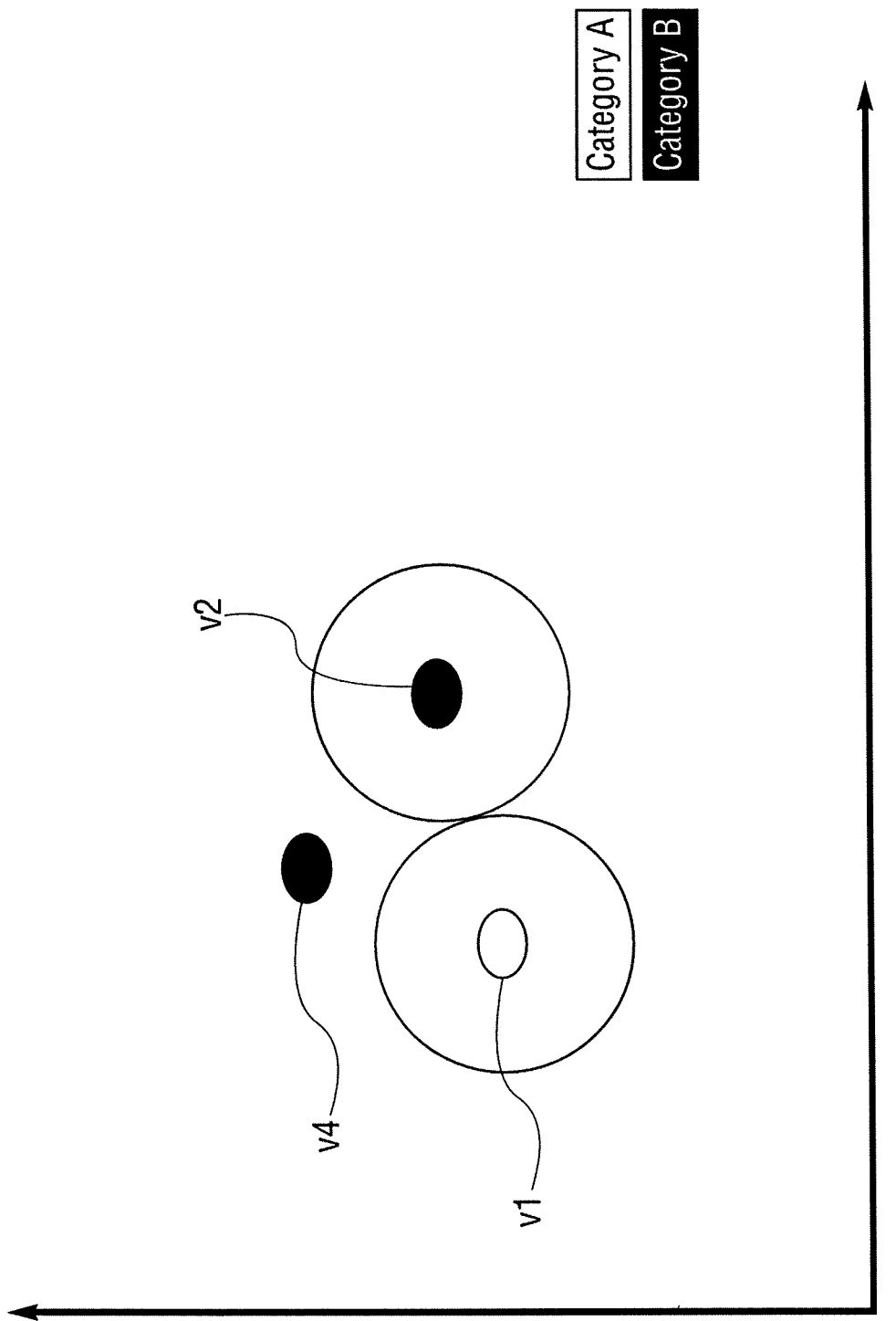
Figure 14:
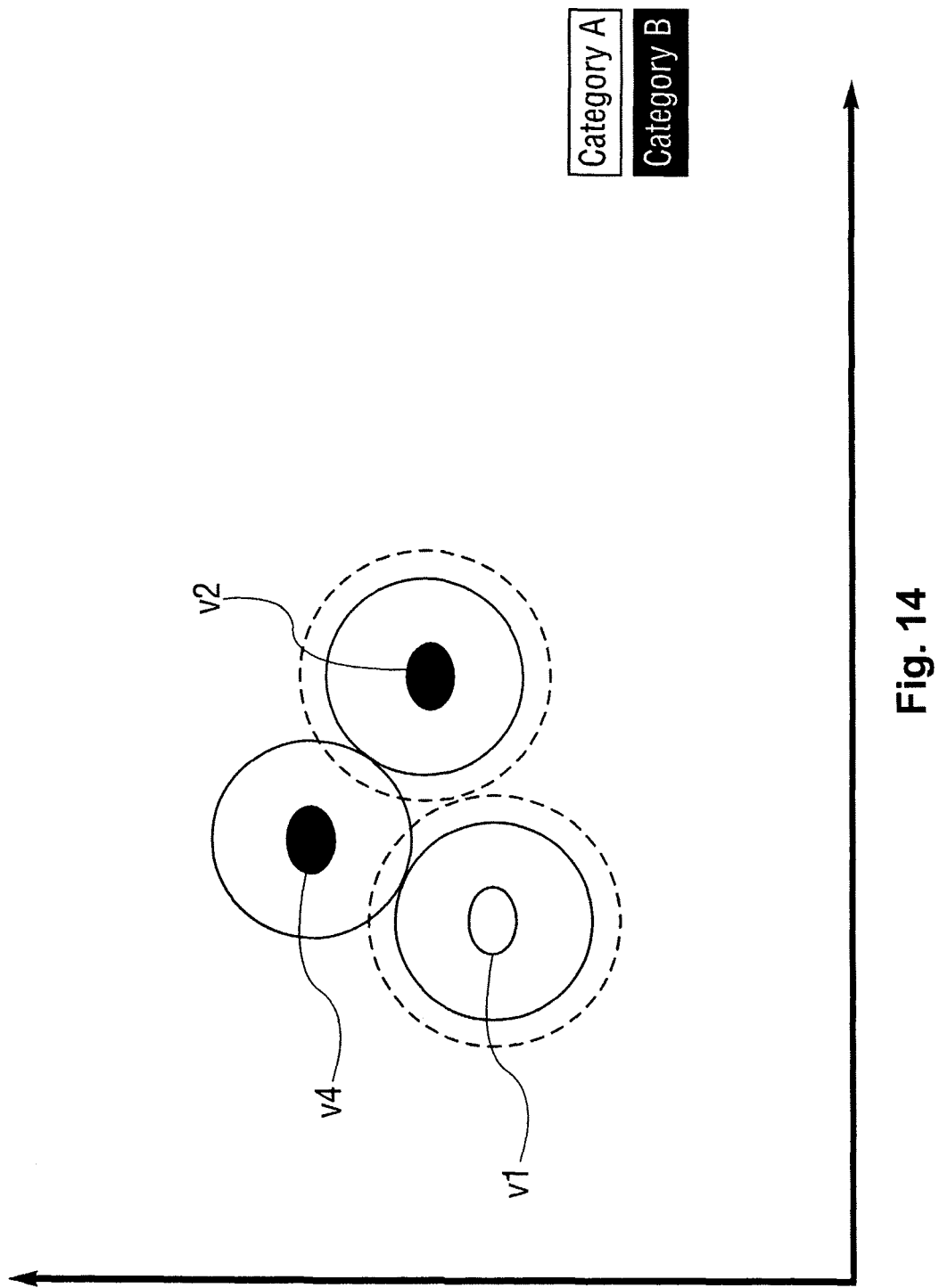
Figure 15:
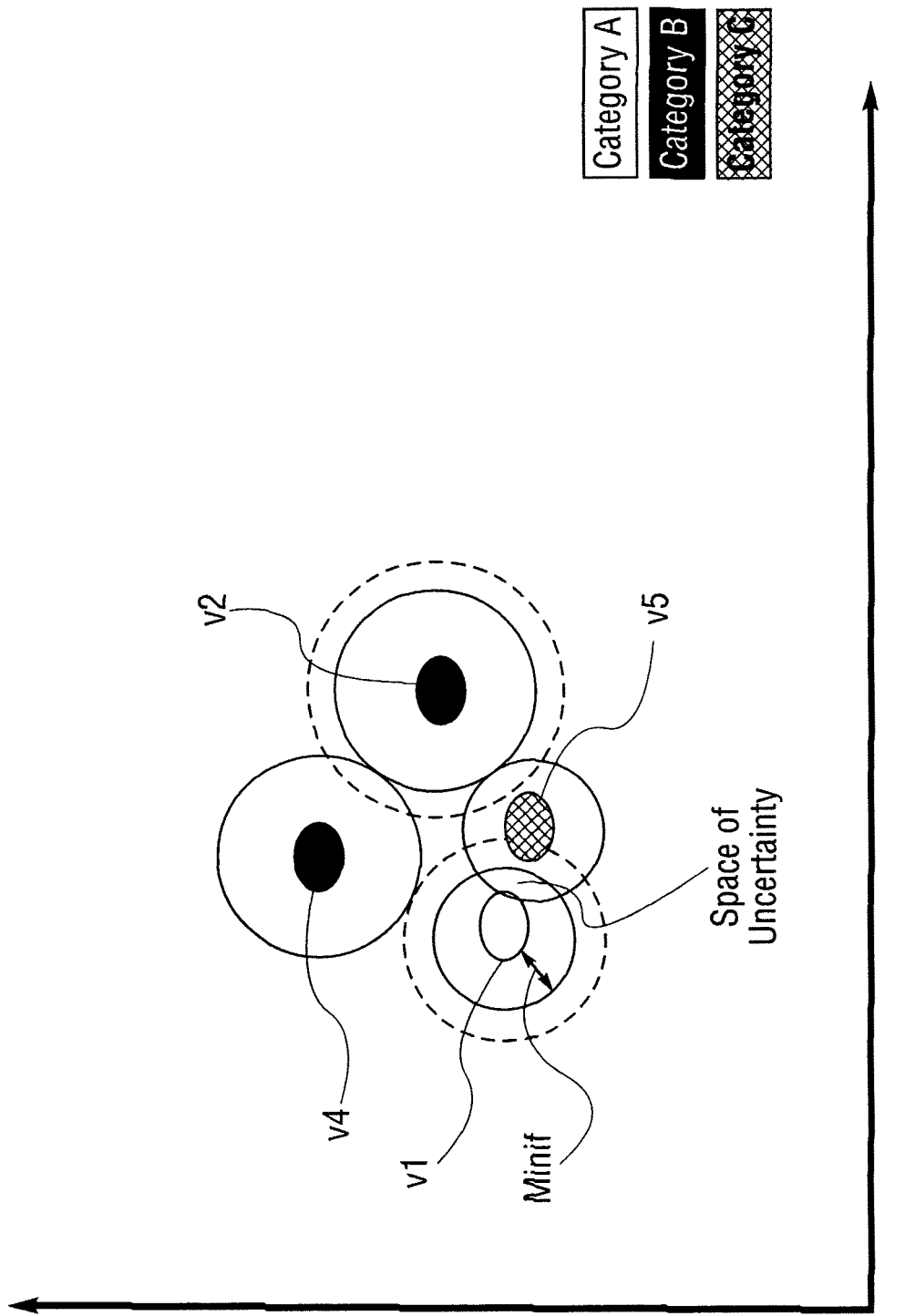
Figure 16:
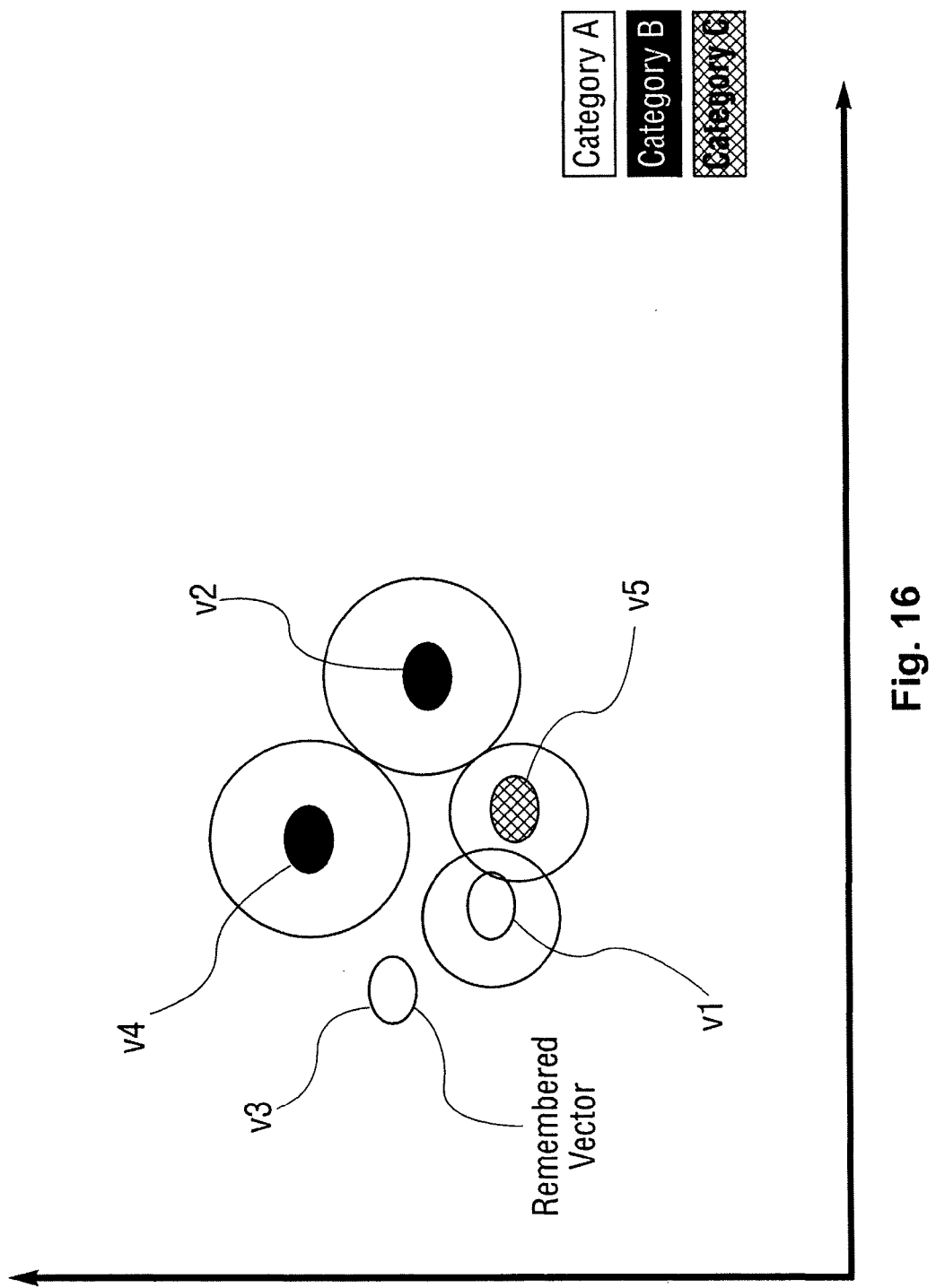
Figure 17:
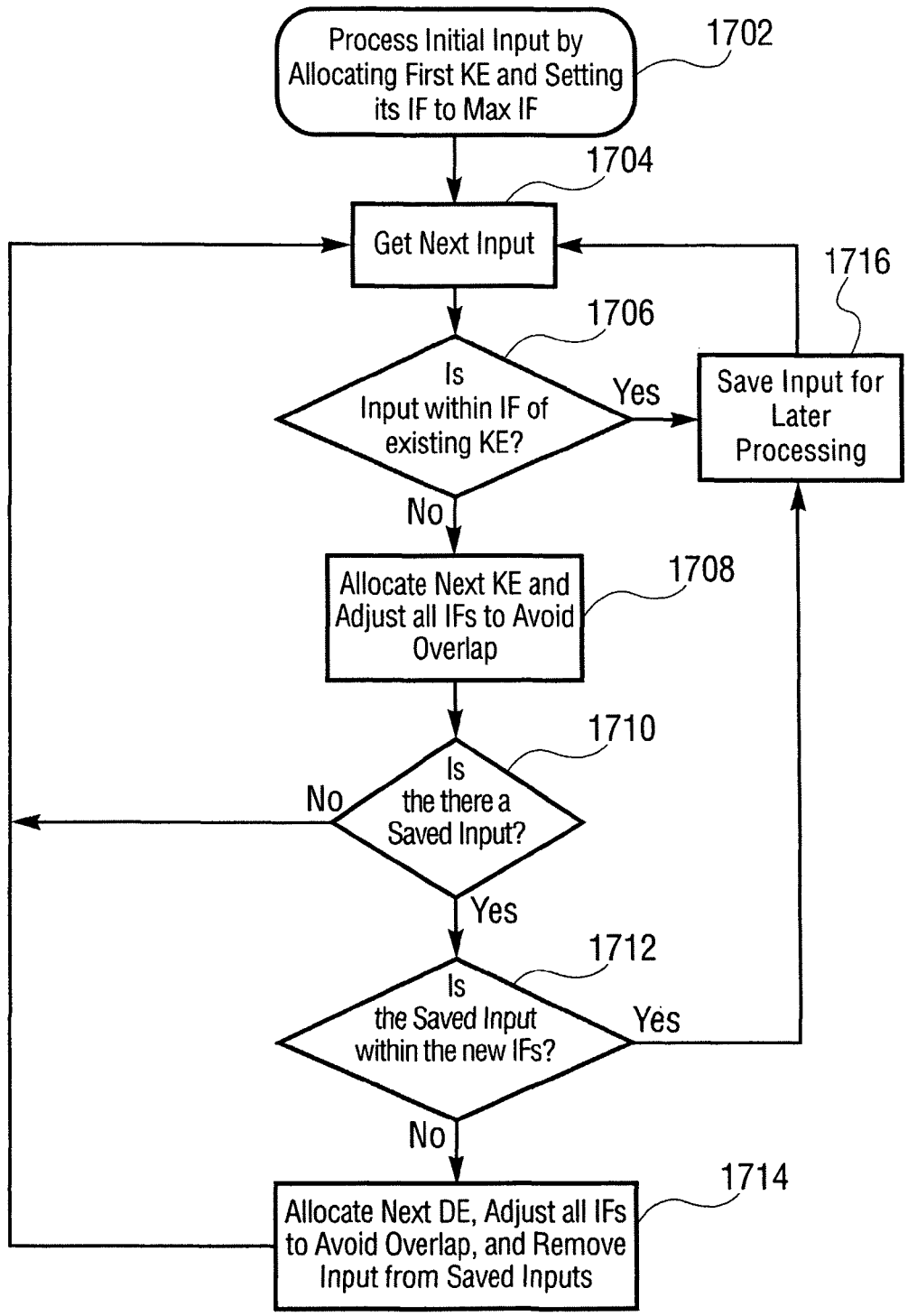
FIG. 17 is a flow chart showing a method directed to a learning function according to one possible implementation of the invention.

In the pattern recognition system according to certain implementations of the invention, all vectors presented for learning that match against existing knowledge elements are remembered and are tried again if a subsequent learning operation reduces the influence field of any knowledge element in the array. In this way, knowledge density can be maximized to aid in increasing the sensitivity of subsequent recognition operations. This learning process is shown pictorially in FIGS. 10 through 16 for an example in a hypothetical 2-D space. FIG. 17 illustrates a method directed to the foregoing. FIG. 10 illustrates a learned vector v1 in category A and a learned vector v2 in category B. As FIG. 10 illustrates, the knowledge element corresponding to vector v1 has an influence field set to the maximum (Maxif) (see FIG. 17, 1702). Vector v2 is the next learned input vector (FIG. 17, 1704). As FIG. 11 illustrates, the influence fields of the knowledge elements for vectors v1 and v2 are adjusted to not overlap, since they have been assigned different categories (1706, 1708). In one implementation, the influence fields of each of the knowledge elements are adjusted equally to prevent the overlap. Other modes can be implemented as well. For example, the influence fields of a selected category can be favored by some weighting factor that causes the favored category to have a larger influence field. As FIG. 12 illustrates, vector v3, in the same category A as vector v1, lies within the influence field of an existing vector (again v1). Accordingly, vector v3 is initially omitted from the knowledge map in that no knowledge element is allocated, but saved for later processing (1706, 1716). FIG. 13 illustrates a vector v4 in Category B, which (as FIG. 14 illustrates) causes the influence field associated with vector v1 to be further reduced (1706, 1708). As FIG. 14 shows, in one operational mode, the influence field associated with vector v2 can also be reduced; however, in another operational mode, influence fields are adjusted only for overlapping knowledge elements in different categories: The selection of mode, in one implementation, can be another partition configuration attribute. FIG. 15 illustrates the addition of vector v5, which causes the influence field associated with vector v1 to reduce to the minimum allowed value (1706, 1708). As FIG. 16 shows, vector v3 no longer lies within the influence field associated with vector v1 and is allocated a knowledge element in the knowledge map (see FIGS. 17, 1710, 1712 & 1714).

C.2. Half-Learning an Input Vector

Figure 18:
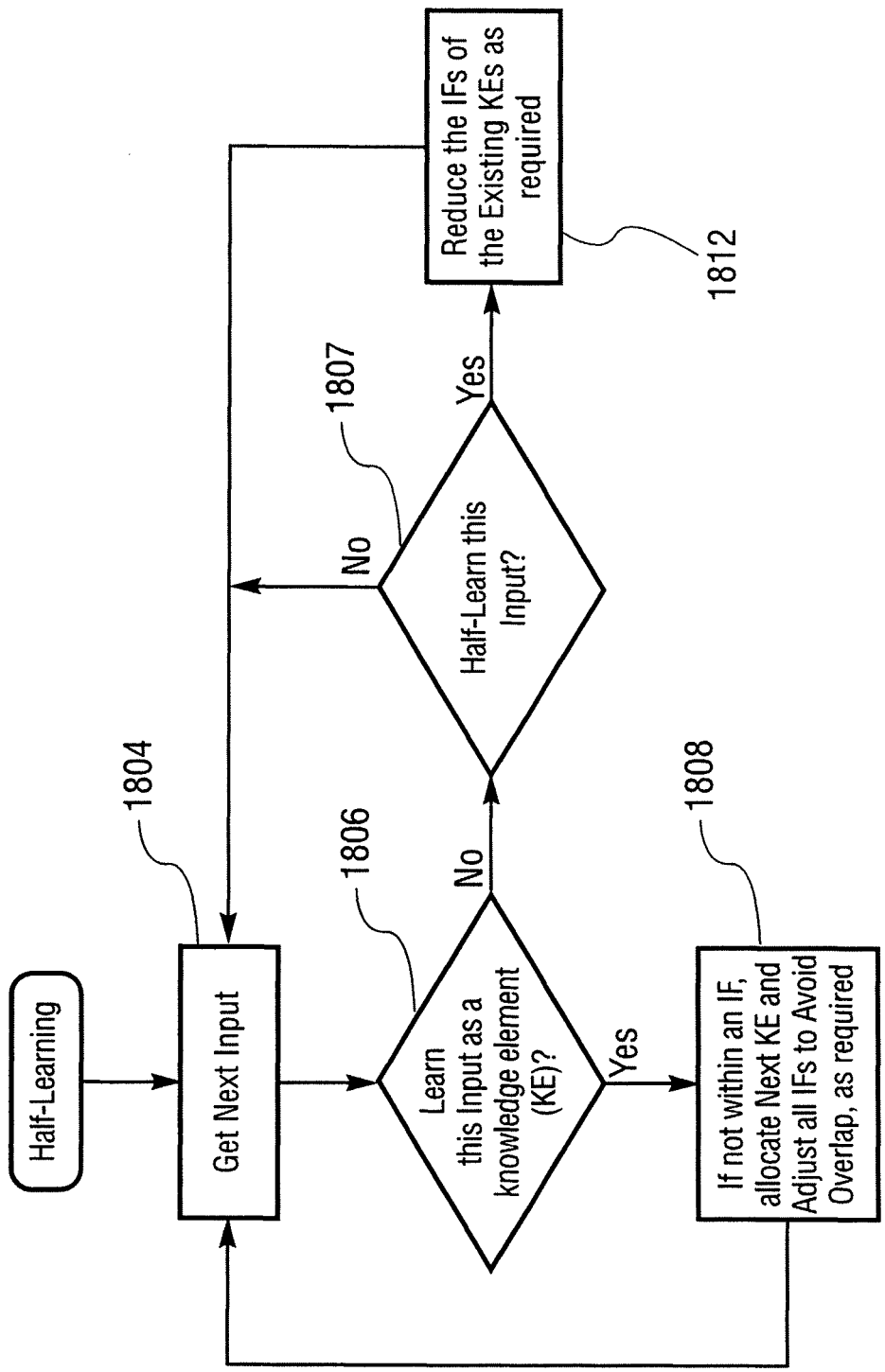
FIG. 18 is a flow chart showing a method directed to a half-learning function according to one possible implementation of the invention.

In many cases, additional input knowledge is not meant to be learned (e.g., allocated a knowledge element) but rather is only used to adjust the influence fields of existing knowledge elements to make sure they would not match the input data on a subsequent recognition operation. The pattern recognition system described here does allow this; it is termed "half-learning". With half-learning, influence fields may be adjusted, but no new knowledge elements are allocated to preserve memory resources. As shown in FIG. 18, with each input to be learned (1804), the pattern recognition engine checks whether the learn command is a half-learn command or a regular learn command (1806). If a regular learn command, the pattern recognition engine allocates a knowledge element if the vector is not within the existing influence field of a knowledge element in the knowledge map and adjusts one or more influence fields as required (1808). If a half learn command (1807), the pattern recognition engine simply adjusts one or more existing influence fields as required (1812).

C.3. Other Enhancements

In the pattern recognition system, the specific identifier, e.g. number, of the matched knowledge element (e.g., array index) is returned for all matched knowledge elements. Thus if an application keeps track of which knowledge element identifiers are allocated when training the knowledge element array, these identifiers can be used when matches occur to reference back to the source of the initial training knowledge, possibly in conjunction with the opaque user data, as described above. The ability to determine the precise knowledge elements which caused a match can be quite useful to a variety of applications. For example, the knowledge elements that did not cause a match may possibly be excluded when developing a knowledge map for the same application in order to save memory space and processing power.

Still further, the pattern recognition system may also maintain user and system counters for each knowledge element. A system counter is incremented each time a knowledge element is matched to an input vector. A user counter is incremented each time a knowledge element is matched to an input vector and when one or more user-defined rules are satisfied. In this manner, the significance of the trained knowledge elements can be assessed. For example, when developing a pattern recognition system for a specific application, such as machine vision in a auto assembly line, the system may be initially trained with 250,000 knowledge elements. Use of the system in a testing environment and analysis of the system and user counters may reveal, for example, that only 100,000 knowledge elements were ever matched and that many of the matched knowledge elements had an insignificant number of matches. An engineer may use this knowledge when implementing the field version of the pattern recognition system to exclude large numbers of knowledge elements, thereby reducing resources (processing and memory) for the given machine vision application.

In the prior art, it was not possible to delete existing knowledge if it was determined that that knowledge was in error. The only approach was to delete all the knowledge and retrain the knowledge element array again and not include the errant knowledge. This took time and required that the original knowledge be retained for subsequent training operations. The pattern recognition system, according to some implementations of the invention, allows individual knowledge elements to be deleted (cleared and marked as available) if it is determined that the knowledge they represent is in error. In addition, subsequent learning operations will use the knowledge elements previously deleted (if any) before the free knowledge element block at the end of the knowledge element array is used. When a knowledge element is deleted, it also triggers a reapplication of the "not learned knowledge," if any (see Section D.1, above).

In addition, the pattern recognition system can also support configurable weighting values that can be selectively applied to knowledge elements of one or more categories to bias selection of for or against that category as to one or more input vectors. For example, the weighting factor can be used to increase the influence fields of RBF knowledge elements or to adjust the resulting aggregate distance computed between an input vector and a knowledge element vector. Again, this may be another configuration parameter for a partition.

In one implementation, the pattern recognition system supports a mode where a knowledge map is held static. For example, in a first dynamic mode, a given knowledge map can be augmented and changed as it is trained with new knowledge. The pattern recognition system also supports a static mode that disables further learning as to a select knowledge map. The fixed size (or further learning disabled mode) can be used to disallow knowledge updates which could cause non deterministic results when two similarly configured machines are modified independent of one another. In one implementation, the commands to enter and exit this mode may require an administrative password to allow for periodic updates, while protecting the knowledge map from updates by unauthorized personnel or applications.

As noted above, the pattern recognition system is implementation-agnostic and can be implemented using software in a general-purpose computing platform. Moreover, as noted above, the pattern recognition system is also amenable to implementation in firmware, hardware (FPGA or ASIC), combinations thereof, etc.

D. Extendable System Architecture

FIG. 1 illustrates an example functional system architecture according to one possible implementation of the pattern recognition system. In this example implementation, the pattern recognition system includes two software-based servers that use the same shared memory. One of the servers is the sensor server 22, which initiates a trigger and then receives sensor readings from a sensor 24 (e.g., image, video, audio, chemical, text, binary, etc.). The other server is the inspection server 20 which triggers and receives results from the sensor server 22. As shown in FIG. 1, both the sensor server 22 and the inspection server 20 can be configured by a human (using for example a USB storage device or a network) or an automated user of the pattern recognition system. In the event that the pattern recognition system includes data sensors that are sensing data of different types (e.g., image and audio, radio frequency), the pattern recognition system might include another software- or hardware-based server (not shown), on the same system or possibly connected via a network (not shown), which combines the results of individual inspection servers to create a higher level or hierarchical result, as described in greater detail earlier. In the subject pattern recognition system, this is termed "sensor fusion".

Additionally, as shown in FIG. 1, the pattern recognition system may include an archiver 26, where the system stores, (locally or remotely) among other things, results from the inspection server 20 and sensor readings from the sensor server 22. Also, as shown in FIG. 1, the pattern recognition system may optionally include a video output device 28 of some type, for display to a human user.

Figure 2:
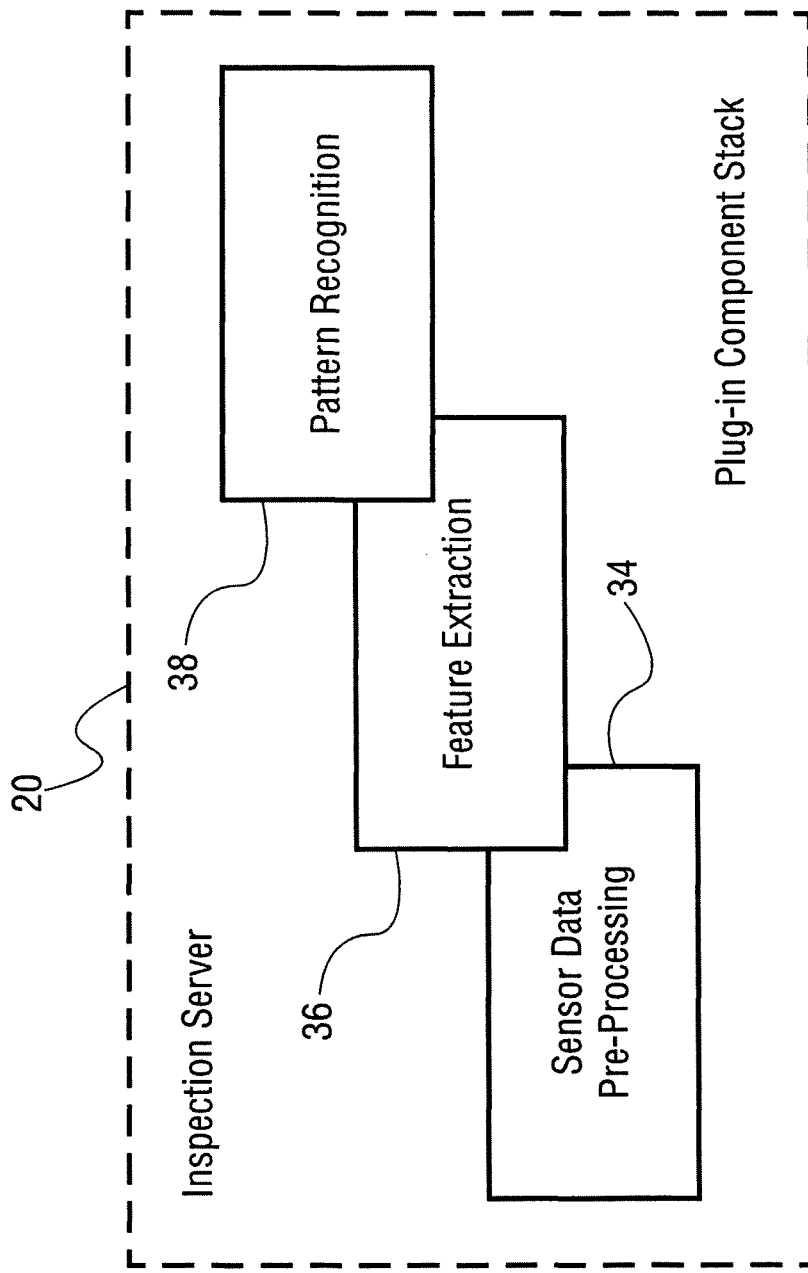
FIG. 2 is a schematic diagram illustrating the plug-in stack component of an example inspection server.

The pattern recognition system includes logic for pattern identification and pattern recognition, which logic is described in detail in this document. That logic, in one implementation, resides in the inspection server 20 shown in FIG. 1. In some embodiments, the pattern recognition system is a scalable system whose resources can be increased as needed. Also, in some embodiments, the pattern recognition system is an extendable system, whose functionality can be readily extended via the use of general-purpose and special-purposes components. In one embodiment, the pattern recognition system is extendable using a set of plug-in components relevant to the task at hand, e.g., machine vision utilizing feature extraction. By choosing the order a particular plug-in component is used during task performance, it is possible to control when invocation occurs with respect to the system logic for pattern identification and pattern recognition. FIG. 2 illustrates an example implementation including a sensor data pre-processing component 34, a feature extraction component 36, and a pattern recognition component 38. See also FIG. 6, which illustrates that the pattern recognition system may take inputs from several feature extraction components during a machine vision task. Preprocessing of the sensory data may be performed prior to attempting pattern recognition and feature extraction. For example, if the task at hand is machine vision, this preprocessing might include filtering to reduce noise, improve resolution, convert to grayscale, etc.

Figure 3:
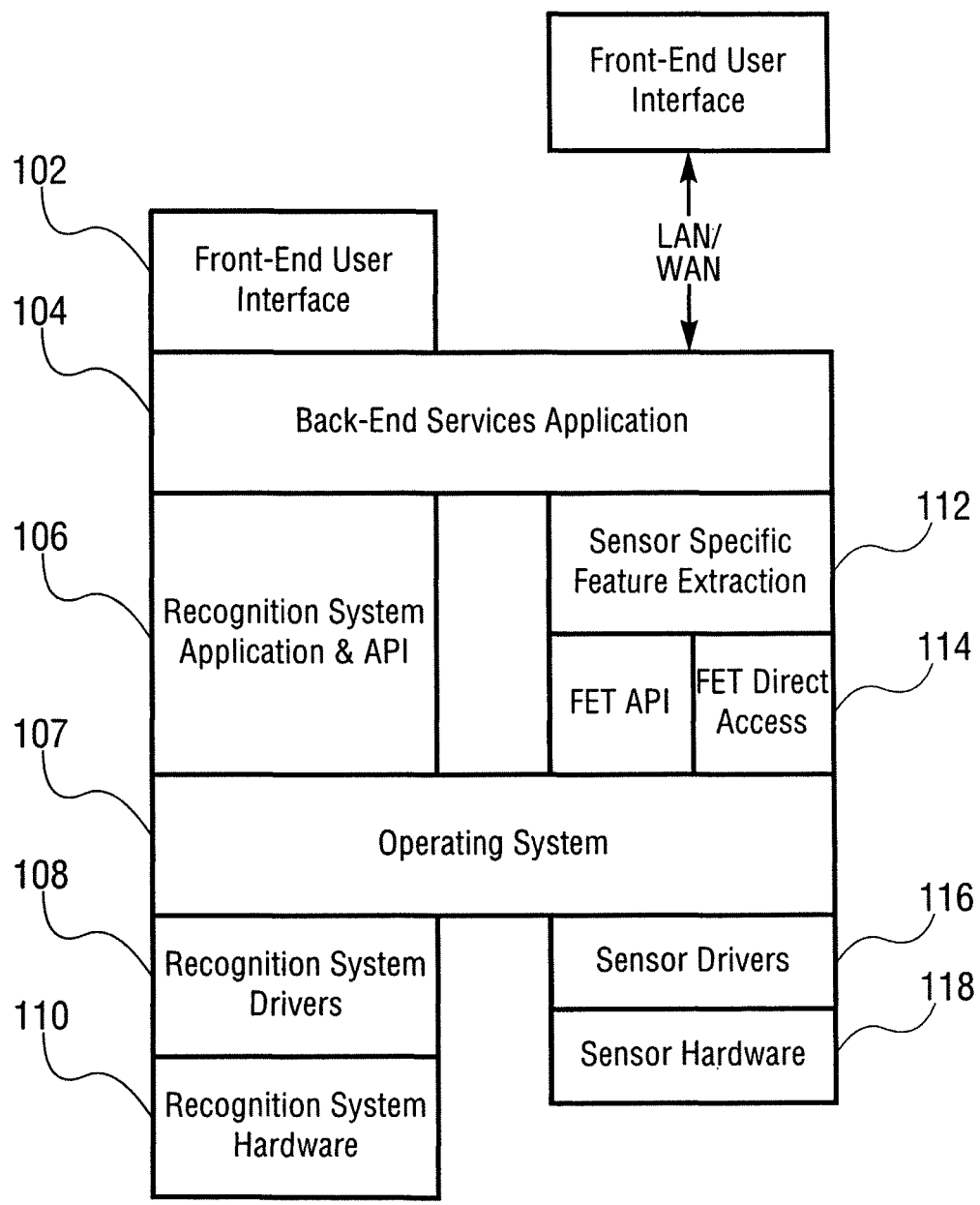
FIG. 3 is a schematic diagram illustrating a software and hardware stack architecture according to an example embodiment.

FIG. 3 is a more detailed picture of a possible component stack that includes feature extraction (FET) functionality. Operating system 107 may be any suitable operating system, e.g. Linux®, Windows® XP. As FIG. 3 illustrates, sensor drivers 116 may provide an API and command layer to sensor hardware 118. Feature extraction and sensor specific feature extraction API layers 112, 114 provide an interface to sensor drivers 116 via operating system 107 and may include functionality operative to pre-process raw data provided by the sensor hardware 118 to extract one or more features or attributes. As discussed below, pattern recognition processing may be offloaded to dedicated recognition system hardware 110, which may for example be a field programmable gate array (FPGA) or other programmable logic circuit implemented on a PCI or other card. Recognition system drivers 108 provide application programming interfaces to the hardware 110, while recognition system application and application programming interface (API) layer 106 provides interfaces to one or more pattern recognition applications (such as back-end services application 104). Back-end user services application 104 is operative to receive sensor input data and provide the input data, via recognition system application and API layer 106 to the recognition system hardware 110 for matching operations. Front-end user interfaces 102, 103 provide user interfaces to facilitate interaction with the pattern recognition system, such as configuration tasks, management tasks, and monitoring tasks.

A pattern recognition system can be hardware or software implementation-agnostic. That is to say, one can implement the pattern recognition system using: (1) software on an existing processor (e.g., Pentium, PowerPC, etc.), as indicated by the API in Appendix A; (2) HDL code for an FPGA (e.g., Xilinx Virtex-4, Altera Cyclone 3); (3) HDL Code in a semi-custom area of an existing generic processor (e.g., IBM Cell(REF)); and (4) full custom Application Specific Integrated Circuit (ASIC). In the case of chip-level implementations (e.g., 2-4 above), the chip might be mounted on a printed circuit board (PCB). This PCB could be on the main PCB for a computing machine or as an expansion PCB which would plug into a interconnect bus (PCI, PCI Express, etc.).

Figure 4:
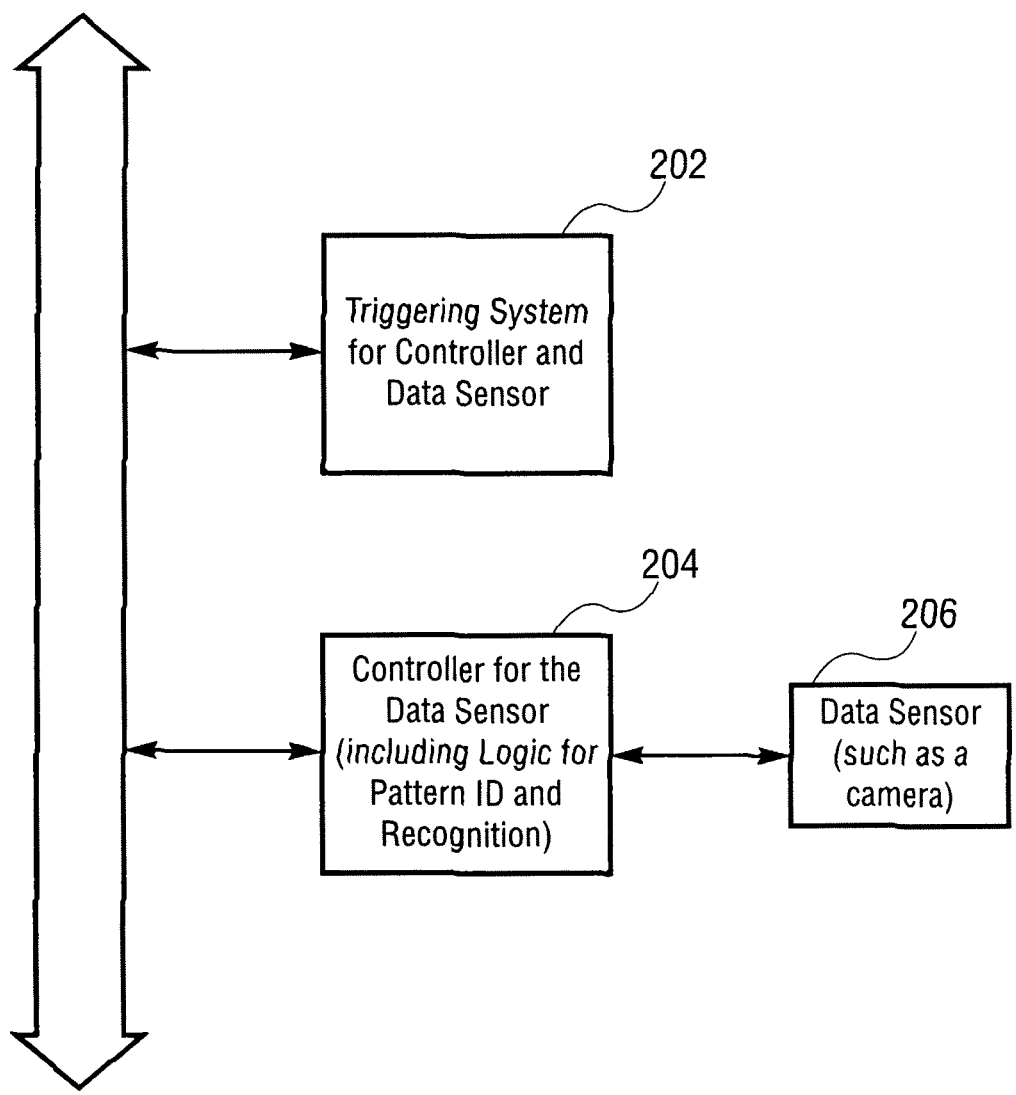
FIG. 4 is a schematic illustrating an example system architecture according to one implementation of the invention.

FIG. 4 shows an embodiment where the pattern recognition system runs, and/or is integrated with, a controller 204 for a data sensor 206, which, e.g., might be a camera if the task to be performed is machine vision. More generally, a data sensor 206 is a device that contains one or more transducers that captures observed physical phenomena, such as sounds, images, radio-frequency signals, etc., and converts them into an analog or binary representation for digital processing of the sensed data. Further, in this embodiment, there might be multiple controllers 204 for multiple data sensors 206, of the same or different types, e.g., a controller for a camera and a controller for a thermal imaging device, such as an infrared camera. Additionally, a triggering system 202 may trigger operation of the data sensor 206 and controller 204, such as when a new part is ready for inspection on an assembly line; or results may be presented asynchronously based on sensor readings.

Figure 5:
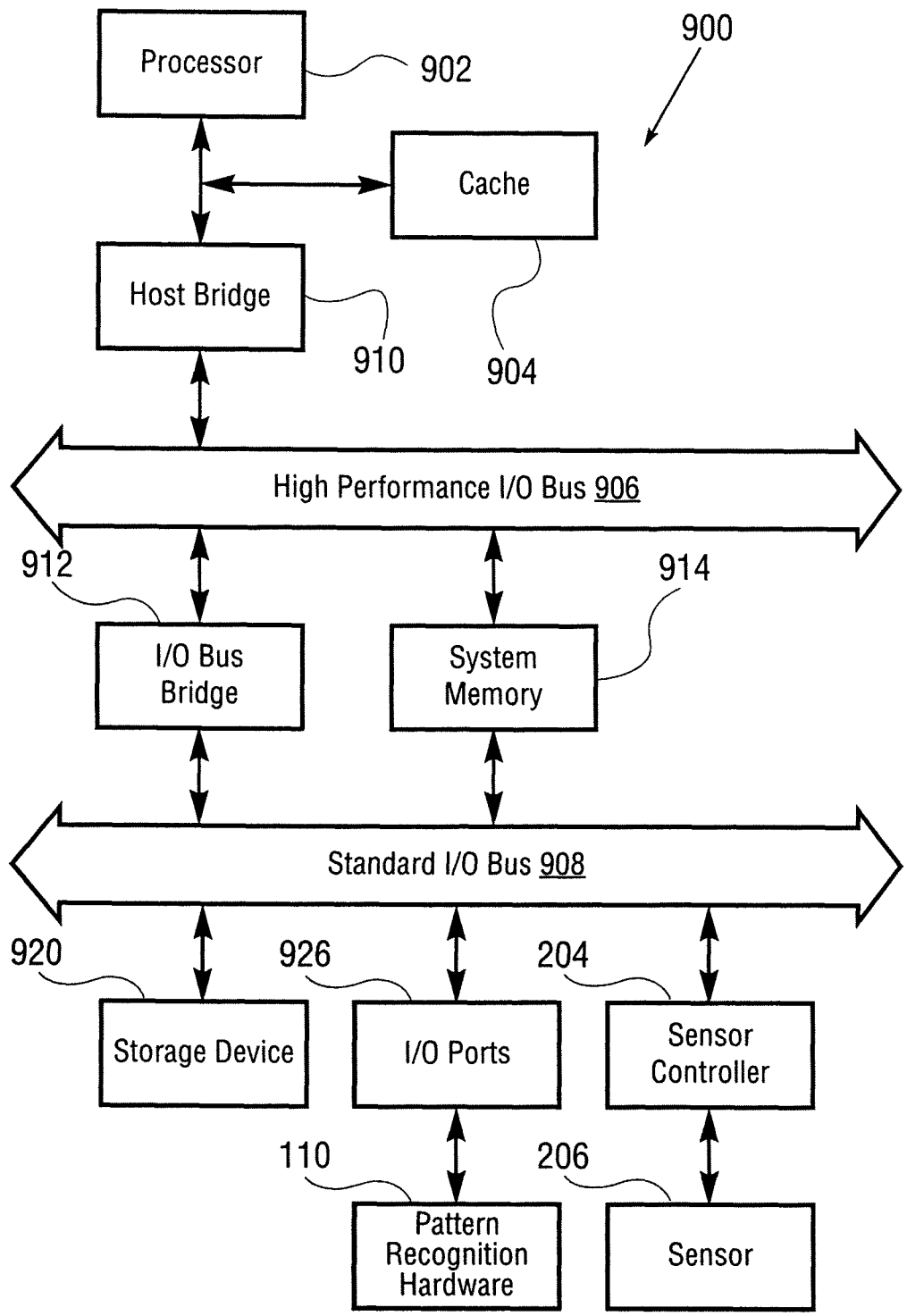
FIG. 5 is a schematic diagram illustrating an example computing system architecture according to one implementation of the invention.

FIG. 5 illustrates for didactic purposes an exemplary general-purpose computing platform, and hardware architecture, which might use the sensor controller 204 shown in FIG. 4. In this embodiment, hardware system 900 includes a processor 902, a system memory 914, sensor controller 204, and one or more software applications and drivers enabling the functions described herein.

Further in FIG. 5, hardware system 900 includes processor 902 and a cache memory 904 coupled to each other as shown. Cache memory 904 is often of two levels, one which is contained as a part of processor 902, and one which is external to processor 902. Additionally, hardware system 900 includes a high performance input/output (I/O) bus 906 and a standard I/O bus 908. Host bridge 910 couples processor 902 to high performance I/O bus 906, whereas I/O bus bridge 912 couples high performance I/O bus 906 and standard I/O bus 908 to each other.

Coupled to bus 906 are sensor controller 204, such as a camera system controller, and system memory 914. A sensor 206 is operably connected to sensor controller 204. The hardware system may further include video memory (not shown) and a display device coupled to the video memory (not shown). Coupled to standard I/O bus 908 bus 908 are storage device 920 and I/O ports 926. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 900 perform their conventional functions known in the art. Storage device 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900. For example, one I/O port 926 may be a PCI interface to which an FPGA implementation of the pattern recognition system hardware 110 is operably connected.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the claimed embodiments may not require nor include all of the above components. For example, storage device 920 may not be used in some systems. Additionally, the peripheral devices shown coupled to standard I/O bus 908 may be coupled instead to high performance I/O bus 906. In addition, in some implementations only a single bus may exist with the components of hardware system 900 being coupled to the single bus. Furthermore, additional components may be included in system 900, such as additional processors, storage devices, or memories.

As noted above in connection with FIG. 3, there are a series of application and driver software routines run by hardware system 900. These software routines comprise a plurality or series of instructions to be executed by a processor in a hardware system, such as processor 902. Initially, the series of instructions are stored on a storage device, such as storage device 920. However, the series of instructions can be stored on any conventional storage medium, such as a diskette, CD-ROM, ROM, EEPROM, flash memory, etc. Furthermore, the series of instructions need not be stored locally, and could be received from a remote storage device, such as a server on a network. The instructions are copied from the storage device, such as storage device 920, into memory 914 and then accessed and executed by processor 902.

An operating system manages and controls the operation of hardware system 900, including the input and output of data to and from software applications (not shown). The operating system and device drivers provide an interface between the software applications being executed on the system and the hardware components of the system. According to one embodiment of the described embodiments, the operating system is the LINUX operating system. However, the described embodiments may be used with other conventional operating systems, such as the Windows® 95/98/NT/XP/Vista operating system, available from Microsoft Corporation of Redmond, Wash. Apple Macintosh Operating System, available from Apple Computer Inc. of Cupertino, Calif., UNIX operating systems, and the like. Of course, other implementations are possible. For example, the functionality of the pattern recognition system may be implemented by a plurality of server blades communicating over a backplane in a parallel, distributed processing architecture. The embodiments discussed in this disclosure, however, are meant solely as examples, rather than an exhaustive set of possible implementations.

E. Implementation Using Programmable Logic Circuit

As indicated above, the pattern recognition engine can be implemented as software on a standard processor or in connection with a semiconductor circuit including a programmable logic circuit, such as a field programmable gate array. In such an implementation, a driver layer (see FIG. 3, above) allows an application to pass commands (e.g., learn, recognize, etc.) to the FPGA, which implements the pattern recognition engine that maintains the knowledge maps and partitions. The benefits of the semiconductor version is the speed of pattern identification for larger knowledge maps (real-time or near real-time) and to off load the host processor. Also in some cases the semiconductor implementation can be used for embedded applications where a standard processor could not.

In one possible FPGA implementation, the pattern recognition engine is installed on a printed circuit board or PCB (which will normally be connected via an interconnect bus, e.g., PCI, PCI-Express, etc.). In one implementation, the FPGA unit is operative to receive an input or test vector, and return an identifier corresponding to a matching knowledge element or a category (and possibly opaque user data) associated with the matching knowledge element. In one implementation, each FPGA pattern recognition unit is a PCI device connected to a PCI bus of a host system.

Sensor reading or polling, sensor data processing and feature extraction operations could be offloaded to a co-processor or developed as an FPGA (or other programmable logic circuit) implementation and installed on a programmable logic circuit. Feature extraction is discussed above. Sensor data processing may involve one or more operations performed prior to feature extraction to condition the data set prior to feature extraction, such as pixel smoothing, peak shaving, frequency analysis, de-aliasing, and the like.

Furthermore, as discussed above, the comparison techniques (RBF, KNN, etc.), distance calculation algorithms ($L_1$, $L_{sup}$, Euclidian, etc.) can be user configurable and plugged in at runtime. In one programmable logic circuit implementation, the selected pluggable algorithms can be stored as a set of FPGA instructions (developed using VERILOG or other suitable SDK) and dynamically loaded into one or more logic units.

Figure 21:
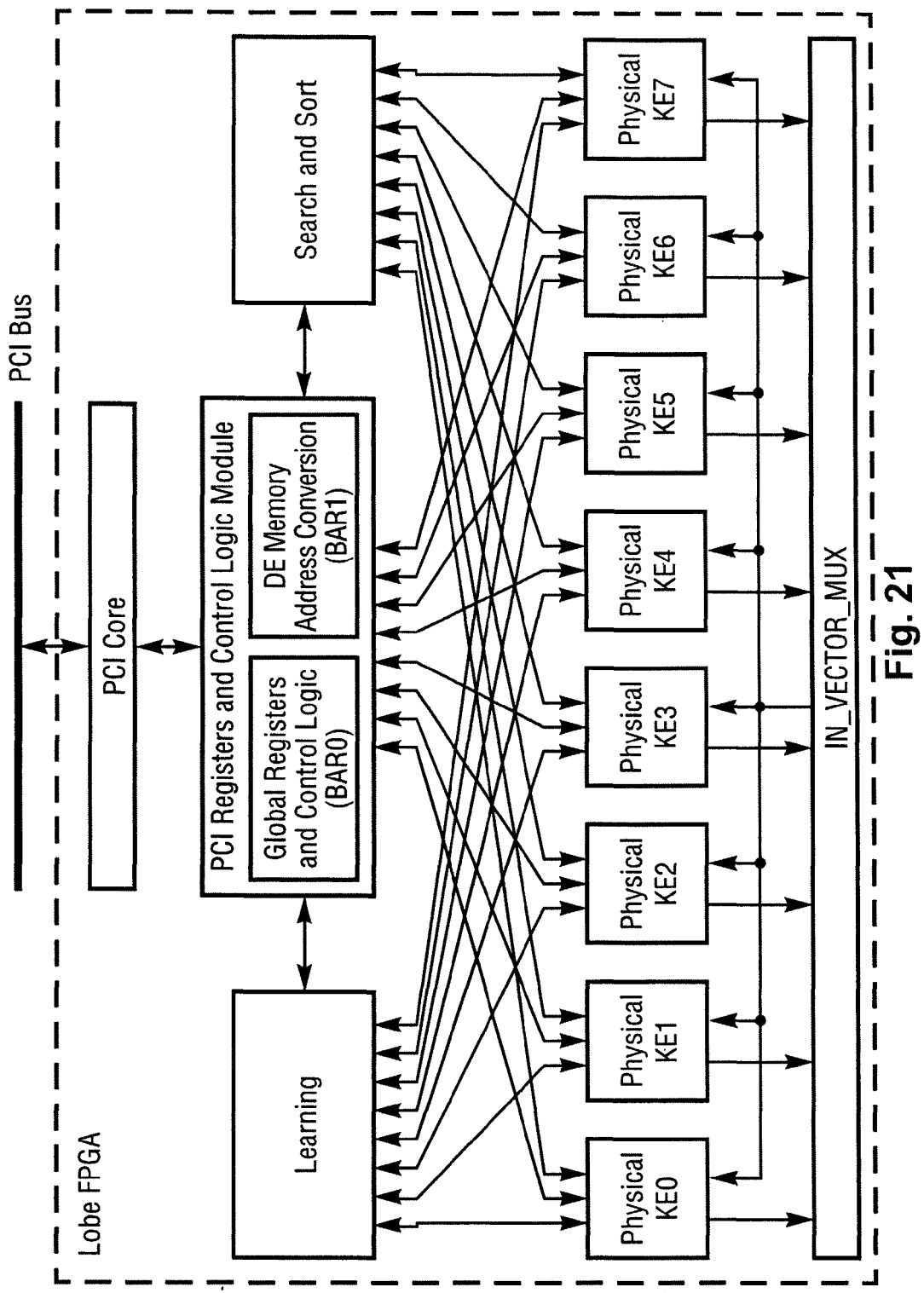
FIG. 21 is a schematic diagram showing an example programmable logic circuit according to one implementation of the invention.

FIG. 21 below shows such an implementation. In this implementation, a Xilinx Spartan-3 family xc3s400 FPGA is configured to implement eight (8) physical knowledge element (KE) engines which interface with block memory to implement the total knowledge element count for the various vector widths. In this regard, the pattern recognition system could incorporate multiple FPGAs, similar to the FPGA described above, and control logic, possibly embodied in hardware or software, to coordinate operation of the multiple FPGAs.

The PCI Registers and control logic module includes registers that are used to configure the chip, and return the status of the chip. The module, in one implementation, includes a memory space for storing data (such as knowledge maps) and configuration information (such as partition information). In one implementation, the memory space is divided or allocated for different aspects of the pattern recognition system. A first memory space includes a set of registers, used in the learning and recognition phases, for the input vector, status information, configuration information, as well as information on matched knowledge elements (or setting of a newly created knowledge element in a learning operation). The matching knowledge element information can include a knowledge element identifier, an actual influence field, a minimum influence field, knowledge element status information (including whether it fired relative to an input vector), a category identifier, a partition, a distance value, and the like.

A second memory space provides for a knowledge element (KE) memory space, for virtual decision elements, allocated among the physical knowledge element engines. In one implementation, a second memory space is for knowledge element information. In one implementation, this memory space is divided into banks. Each bank is further divided into areas for knowledge element registers, and knowledge element vectors. One to all the banks may also include an area for storing one or more input vectors or portions of input vectors. Each virtual knowledge element, in one implementation, has its own set of registers in the knowledge element register, including for example, knowledge element identifiers, actual influence field, minimum influence field, partition identifier, category identifier, one or more distance field register that indicates the distance between an input vector and the corresponding learned vector of the virtual knowledge element. Each bank of the second memory space also stores the learned vectors for each of the virtual knowledge elements allocated to it. The maximum number of learned vectors and knowledge elements in each bank is determined by the vector width. The control module, in one implementation, provides a memory address conversion for the knowledge element memory, as well as the de-multiplexer for read back. In one implementation, the second memory space also provides for storage of one or more input/test vectors. Of course, the memory space may be divided and arranged in a variety of configurations.

In one implementation, a learning module performs various learning operations, such as scanning all the existing knowledge elements, adjusting the existing knowledge element influence fields, setting category identifiers, finding the minimum distance to different category knowledge elements, and creating a new knowledge element if needed. In one implementation, the learning module can implement the learning functionality described above. The circuit may also include a multiplexer that provides a given test vector to the respective physical knowledge element engines. In one implementation, a physical knowledge element includes logic to compute the distance between a test vector and the learned vectors corresponding to the virtual knowledge elements to which the physical knowledge element has been assigned. In one implementation, each physical knowledge element engine is further operative to search for the minimum computed distance among the virtual knowledge elements to which it has been assigned. In one implementation, each physical knowledge element operates on an input vector to identify an assigned virtual knowledge element having the minimum distance to the input vector. In one implementation, the FPGA is a parallel processor in that the physical knowledge elements operate in parallel. In one implementation, each physical knowledge element computes a distance using an input vector and writes the computed distance to a distance register of the corresponding virtual knowledge element. The logic of the physical knowledge element is operative to return the knowledge element information corresponding to the virtual knowledge element having the minimum distance to the input vector. In one implementation, the control logic is operative to identify the virtual knowledge element having the overall minimum distance identified across the multiple physical knowledge element engines. In one implementation, the pattern recognition system provides results at each interconnect bus cycle. That is, on one interconnect bus clock cycle the input data vector or vectors are loaded across the bus and on the next bus cycle results are ready.

Given this bus clock cycle overhead, 100% parallelism in the knowledge elements is no longer required. Rather the pattern recognition system leverages the limited FPGA resources to implement the virtual knowledge elements. Using a virtual knowledge element approach, a plurality of physical knowledge element engines are implemented in the FPGA, each of which may relate to multiple virtual decision elements. Specific knowledge element contents would be stored in the FPGA memory to allow many hundreds of virtual knowledge elements to be implemented across a lesser number of physical knowledge element engines. These virtual KEs operate in a daisy chain or round-robin approach on the FPGA memory blocks to implement the total KE count coupled with the real, physical knowledge elements that are constructed in the FPGA's gate array area. Each virtual knowledge element has its own influence field. When learning causes a new virtual knowledge element to be allocated, the allocated virtual knowledge element number is returned. When a match occurs in the recognition phase, the firing virtual knowledge element number is returned. A 32-bit register can be implemented in each virtual knowledge element. This register can be written in learning phase. The value will be returned in the recognition phase unchanged. An application has full access to the virtual knowledge element memory space. The application can save the knowledge element network to hard disk and later reload the knowledge element network into the FPGA. The user can modify the knowledge element network according to their special need at anytime except while a learning or recognition operation is in process. Through this interface knowledge elements can also be deleted if desired.

Figure 22:
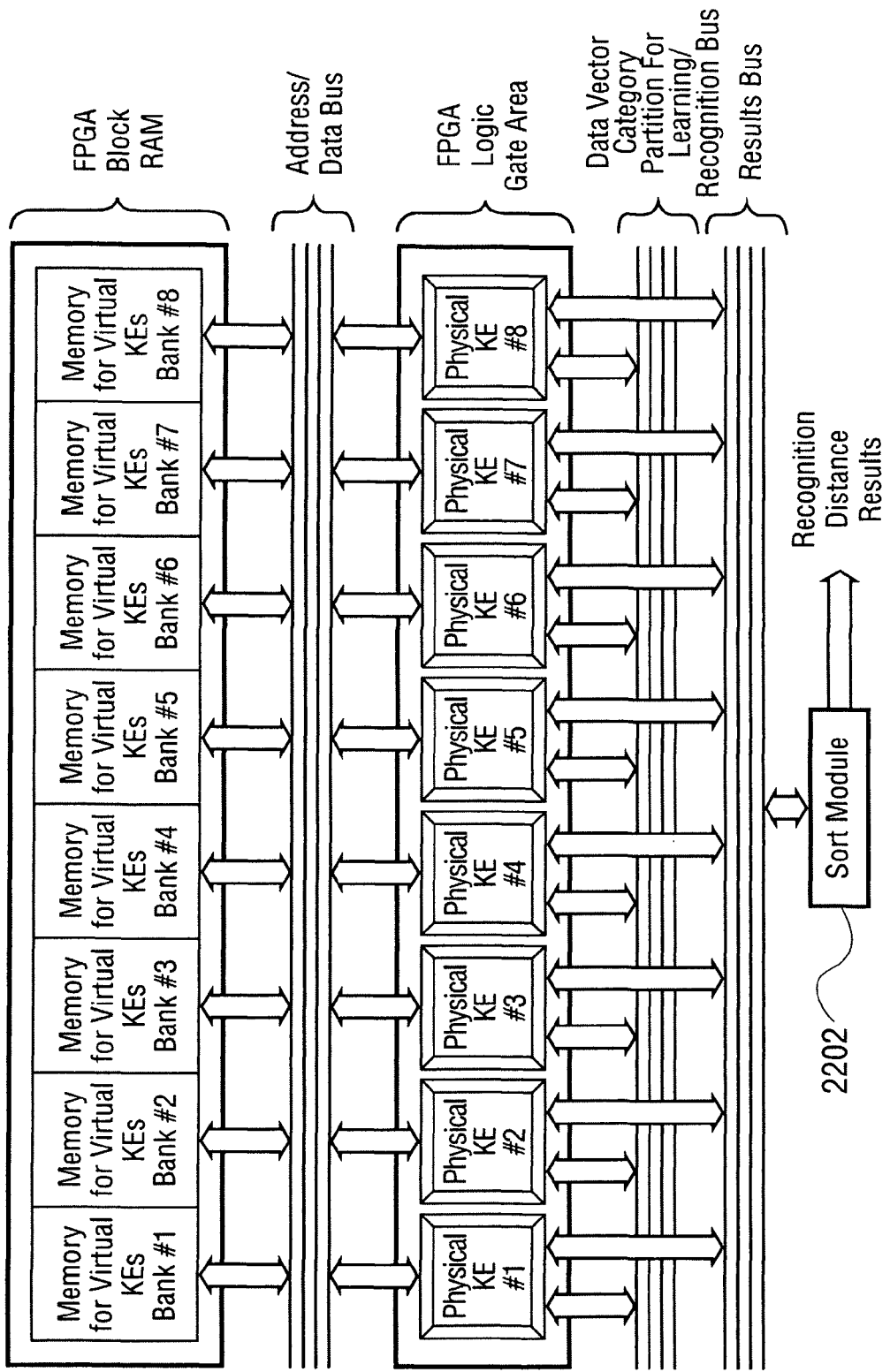
FIG. 22 is a schematic diagram showing an example programmable logic circuit according to one implementation of the invention.

FIG. 22 below shows how these virtual knowledge elements relate to their physical counterparts in one possible FPGA implementation. FIG. 22 depicts a sort module 2202 used in some implementations of the FPGA. In a recognition operation, each physical knowledge element engine (Physical KE) measures the distance of all the matches for the virtual knowledge elements (Virtual KE) that it controls, and rank orders them by distance. This information is made available to a higher level functional circuit which combines the results of the physical knowledge element engines to create the final overall result.

Additionally, in the FPGA implementation, the pattern recognition system can be implemented using a pipeline approach as many data vectors can be loaded in a single interconnect bus clock cycle thus further speeding the overall result time for many data vectors needing identification. That is, the pipeline may increase the effective speed of recognition performed by the FPGA.

Figure 23:
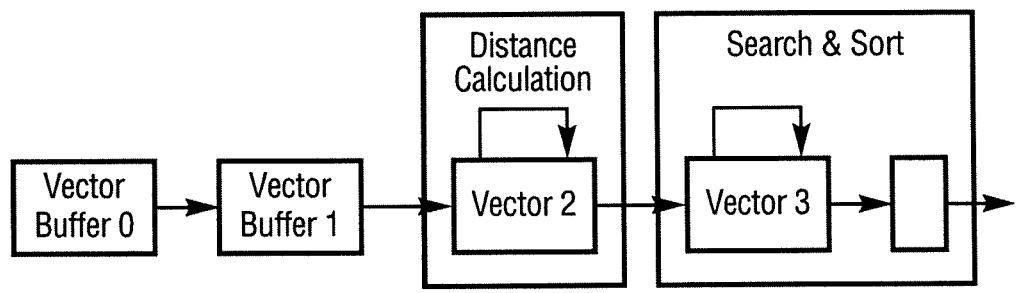

As shown in FIG. 23, the pipeline has 3 stages: 1) search and sort; 2) distance calculation and 3) vector buffers. Four input vectors can be stored in the FPGA. The vectors are processed first in-first out. When the Buffer Ready flag is set, it means that vector buffer 0 is empty. The user (e.g., the programmer) can write a vector into the FPGA. The input vector written into the FPGA, in one implementation, is written into buffer 0. After the last byte of the vector is written, vector buffer 0 will be locked (not ready). When the next stage is empty, the vector will move forward, and Buffer 0 will be empty (ready) again. Writing a vector into the FPGA while buffer 0 is not ready will cause an error. Setting NEXT_VECTOR flag will push the vector at the search and sort stage out of the pipeline. The other vectors in the pipeline will move forward.

The RESET flag can be used to remove all the vectors in the FPGA. With this mechanism, two vectors can be processed at same time, where a distance calculation is performed relative to one input vector, while a search and sort operation can be performed relative to a second input vector.

In addition, while waiting for the result, software can write other vectors into the FPGA. In addition, while waiting for the minimum distance to be read out, a next minimum distance can be searched.

Figure 24:
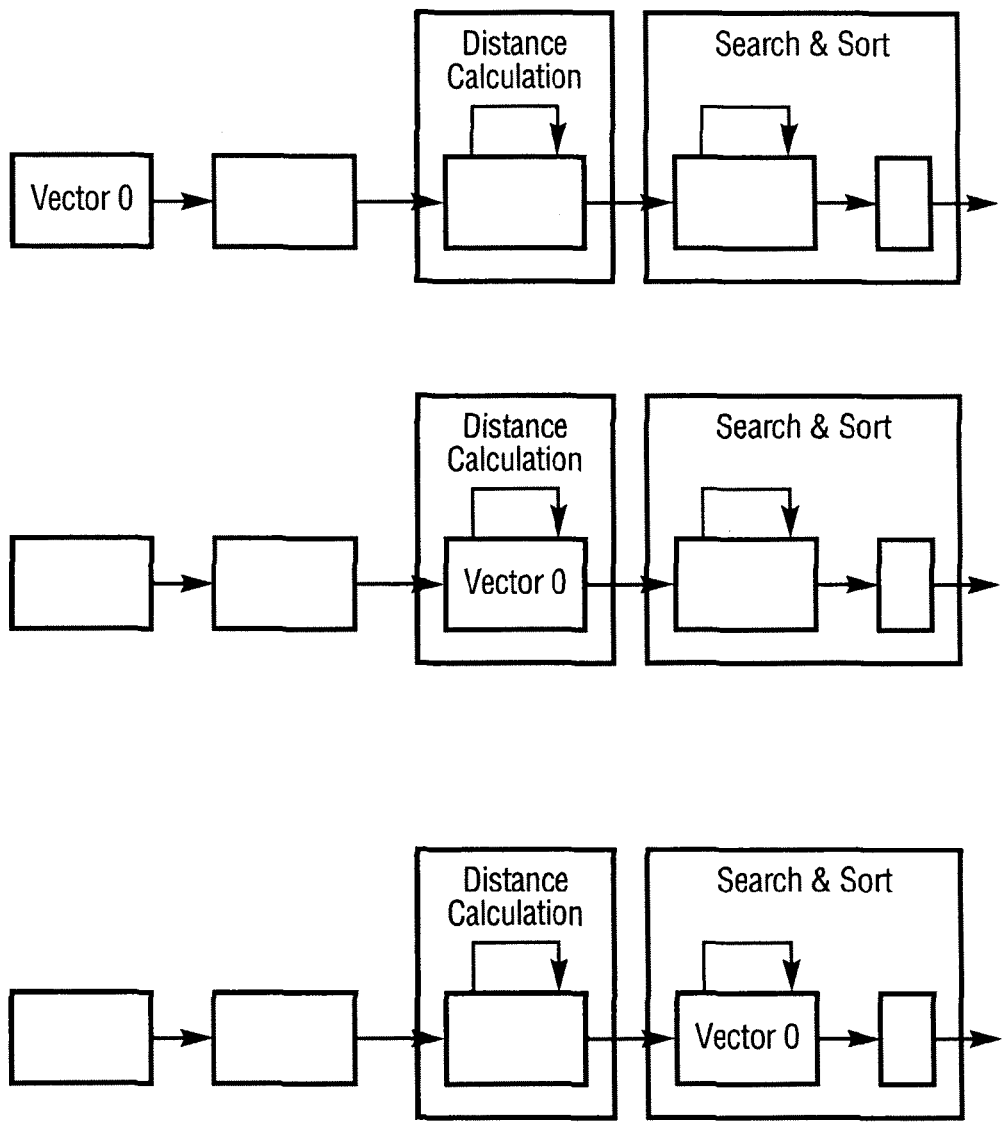

For the application software, reading results and writing vectors can be performed in two separate threads. When the Buffer Ready is set, the application can write a vector into the FPGA. When the Ready flag is set, the application can read the result out. Read knowledge element number and distance will trigger hardware to search for the next matched knowledge element. To process the next vector, the application can set the NEXT_VECTOR flag. The first input vector just flows through to the end and sets the status flag when the results are ready. This is shown in FIG. 24.

Figure 25:
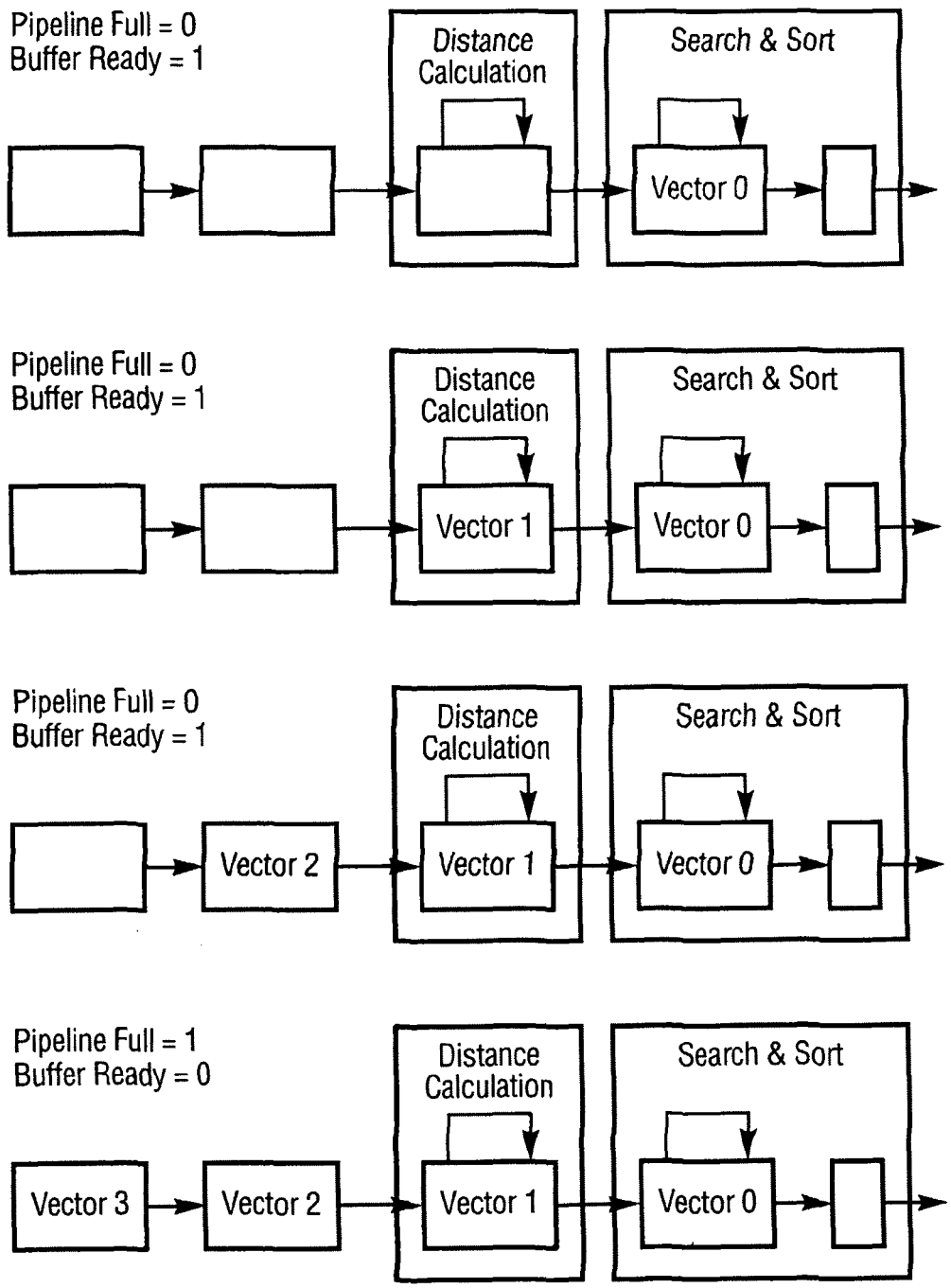

When the application needs to process vectors one by one, the user can write the vector in, and wait for the result. After this vector has been processed, the application can set the NEXT_VECTOR flag to remove this vector from the pipeline, and then write the next vector in. The next vector will flow through to the end just like the first vector. If the user doesn't set the NEXT_VECTOR flag to remove the front end vector, the second input vector will flow through to the distance calculation stage, and the third vector will wait in the vector buffer 1. They will not push the first vector out, as illustrated in FIG. 25.

When the pipeline is full, the application sets the NEXT_CONFIG flag to remove the front end vector out of the pipeline before writing another vector in. All the other vectors will move forward. For example, as shown in FIG. 26, vector 0 will be pushed out, vector 1 will move into search and sort stage, the vector in buffer 1 will move to the distance calculation stage. Buffer 0 will be empty. The Buffer Ready flag will be set again.

To recapitulate with respect to pipelining, vectors can be written into the vector buffer when vector buffer is empty. When the distance calculation stage is free, the vector in the vector buffer 1 will be moved forward, and vector buffer 1 will be left free for next vector. When the distance calculation is finished, and the search & sort stage is free, the vector will be moved forward (actually it will be discarded). The minimum distance will be searched, and copied to the output buffer. Next the minimum distance will be searched while waiting for the minimum distance to be read. The vector at Search & Sort stage will be discarded when software writes another vector into the FPGA.

As is relevant to the partitions discussed above, given the structure of the FPGA block RAM according to one possible implementation, four different vector widths (32/64/128/256-bytes) can be supported, which in turn, result in four different virtual KE counts (672/400/224/112). Thus, an application can choose the width and count most appropriate to the task at hand. Of course, other FPGA implementation may allow for different vector widths and Finally, physical knowledge elements might be loaded with different distance calculation algorithms for different requirements. Thus, the FPGA can be configured to allow all physical knowledge elements to use the same recognition math or algorithm. Alternatively, each physical knowledge element can be configured to use a different math, e.g., $L_1$ or $L_{sup}$. Or further still, the math for the physical knowledge elements can be swapped in/out based on the partition chosen for pattern identification and the partition's associated "math" requirements.

While a number of exemplary aspects and embodiments have been discussed above, those of skill in the art will recognize certain modifications, permutations, additions and sub-combinations thereof. It is therefore intended that the scope of the invention includes all such modifications, permutations, additions and sub-combinations. For example, the use of virtual knowledge elements in connection with physical engines can be implemented in other programmable logic circuits and in application specific integrated circuits (ASICs). An additional example would be where external memories (host based or local to the pattern recognition machine) are used to supplement the FPGA or ASIC "on-chip" memory to provide for larger numbers of knowledge elements. It is therefore not intended that the invention be limited except as indicated by the appended claims.

What is claimed is:

1. A pattern recognition system, comprising memory and one or more processors operatively coupled to the memory and configured in a learning-enabled mode to:
   receive a plurality of input vectors;
   generate a knowledge element for each of first ones of the input vectors in unsupervised operations, each knowledge element including a point in an n-dimensional space represented by the corresponding input vector and having an influence field associated therewith, wherein the influence fields of the respective knowledge elements are substantially equal, and wherein the knowledge elements represent a single category of data;
   match each of second ones of the input vectors to at least one of the knowledge elements within the influence field of which the second input vector lies; and
   maintain a count for each knowledge element representing a number of the input vectors corresponding to that knowledge element, the counts collectively representing statistical regularities of patterns represented by the input vectors;
   wherein the one or more processors are further configured to, in a learning-disabled mode in which generation of further knowledge elements is not allowed, match third ones of the input vectors to the knowledge elements.

2. The pattern recognition system of claim 1 wherein the plurality of knowledge elements forms a first one of a plurality of partitions of a knowledge element array maintained in the memory, and wherein the one or more processors are further configured to receive a partition identifier and a partition configuration corresponding to the first partition, the partition configuration identifying a comparison technique for comparing the second input vectors to the knowledge elements of the partition.

3. The pattern recognition system of claim 2 wherein the one or more processors are further configured to combine results from the plurality of partitions to achieve a higher level result by connecting operations of the plurality of partitions in a hierarchical relationship or a serial relationship.

4. The pattern recognition system of claim 1 wherein the one or more processors are further configured to adjust the influence fields of the knowledge elements substantially equally as new knowledge elements are generated, thereby constraining a total number of knowledge elements.

5. The pattern recognition system of claim 1 wherein the one or more processors are further configured to limit generation of knowledge elements to a maximum number.

6. The pattern recognition system of claim 1 wherein the one or more processors are further configured to delete particular ones of the knowledge elements based on the corresponding counts.

7. A pattern recognition system, comprising memory and one or more processors operatively coupled to the memory and configured to:

receive a plurality of input vectors;
process the input vectors by masking or weighting one or more components of at least some of the input vectors;
generate a knowledge element for each of first ones of the input vectors, each knowledge element including a point in an n-dimensional space represented by the corresponding input vector and having an influence field associated therewith, wherein the influence fields of the respective knowledge elements are substantially equal, wherein the knowledge elements represent a single category of data, and wherein the one or more processors are configured to limit generation of knowledge elements to a maximum number;
match each of second ones of the input vectors to at least one of the knowledge elements within the influence field of which the second input vector lies; and
maintain a count for each knowledge element representing a number of the input vectors corresponding to that knowledge element, the counts collectively representing statistical regularities of patterns represented by the input vectors.

8. The pattern recognition system of claim 7 wherein the one or more processors are configured to generate the knowledge elements in unsupervised operations.

9. The pattern recognition system of claim 7 wherein the first and second input vectors comprise training vectors, and the one or more processors are configured to generate the knowledge elements in supervised operations.

10. The pattern recognition system of claim 7 wherein the one or more processors are configured to generate the knowledge elements and associated counts in a learning-enabled mode, and to match third ones of the input vectors to the knowledge elements in a learning-disabled mode in which generation of further knowledge elements is not allowed.

11. The pattern recognition system of claim 7 wherein the plurality of knowledge elements forms a first one of a plurality of partitions of a knowledge element array maintained in the memory, and wherein the one or more processors are further configured to receive a partition identifier and a partition configuration corresponding to the first partition, the partition configuration identifying a comparison technique for comparing the second input vectors to the knowledge elements of the partition.

12. The pattern recognition system of claim 11 wherein the one or more processors are further configured to combine results from the plurality of partitions to achieve a higher level result by connecting operations of the plurality of partitions in a hierarchical relationship or a serial relationship.

13. The pattern recognition system of claim 7 wherein the one or more processors are further configured to adjust the influence fields of the knowledge elements substantially equally as new knowledge elements are generated, thereby constraining a total number of knowledge elements.

14. The pattern recognition system of claim 7 wherein the one or more processors are further configured to delete particular ones of the knowledge elements based on the corresponding counts.

15. A pattern recognition system, comprising memory and one or more processors operatively coupled to the memory and configured to:

generate a plurality of input vectors using previously digitized information or information generated by one or more sensors;
generate a knowledge element for each of first ones of the input vectors, each knowledge element including a point in an n-dimensional space represented by the corresponding input vector and having an influence field associated therewith, wherein the influence fields of the respective knowledge elements are substantially equal, and wherein the knowledge elements represent a single category of data;
match each of second ones of the input vectors to at least one of the knowledge elements within the influence field of which the second input vector lies;
maintain a count for each knowledge element representing a number of the input vectors corresponding to that knowledge element, the counts collectively representing statistical regularities of patterns represented by the input vectors; and
delete particular ones of the knowledge elements based on the corresponding counts.

16. The pattern recognition system of claim 15 wherein the one or more processors are configured to generate the knowledge elements in unsupervised operations.

17. The pattern recognition system of claim 15 wherein the first and second input vectors comprise training vectors, and the one or more processors are configured to generate the knowledge elements in supervised operations.

18. The pattern recognition system of claim 15 wherein the one or more processors are configured to generate the knowledge elements and associated counts in a learning-enabled mode, and to match third ones of the input vectors to the knowledge elements in a learning-disabled mode in which generation of further knowledge elements is not allowed.

19. The pattern recognition system of claim 15 wherein the plurality of knowledge elements forms a first one of a plurality of partitions of a knowledge element array maintained in the memory, and wherein the one or more processors are further configured to receive a partition identifier and a partition configuration corresponding to the first partition, the partition configuration identifying a comparison technique for comparing the second input vectors to the knowledge elements of the partition.

20. The pattern recognition system of claim 19 wherein the one or more processors are further configured to combine results from the plurality of partitions to achieve a higher level result by connecting operations of the plurality of partitions in a hierarchical relationship or a serial relationship.

21. The pattern recognition system of claim 15 wherein the one or more processors are further configured to adjust the influence fields of the knowledge elements substantially equally as new knowledge elements are generated, thereby constraining a total number of knowledge elements.

22. The pattern recognition system of claim 15 wherein the one or more processors are further configured to limit generation of knowledge elements to a maximum number.

23. The pattern recognition system of claim 15 wherein the one or more processors are further configured to process the input vectors by masking or weighting one or more components of at least some of the input vectors.

* * * * *